(12) United States Patent
Suzuki

(10) Patent No.: US 10,630,880 B2
(45) Date of Patent: Apr. 21, 2020

(54) IMAGE CAPTURING APPARATUS, LIGHT EMITTING APPARATUS, AND CONTROL METHODS THEREOF

(71) Applicant: CANON KABUSHIKI KAISHA, Tokyo (JP)

(72) Inventor: Ryuta Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 16/166,517

(22) Filed: Oct. 22, 2018

(65) Prior Publication Data
US 2019/0124252 A1    Apr. 25, 2019

(30) Foreign Application Priority Data
Oct. 25, 2017 (JP) ................. 2017-206331

(51) Int. Cl.
*H04N 5/225* (2006.01)
*H04N 5/232* (2006.01)
*H04N 5/235* (2006.01)

(52) U.S. Cl.
CPC ....... *H04N 5/23206* (2013.01); *H04N 5/2256* (2013.01); *H04N 5/2353* (2013.01); *H04N 5/2354* (2013.01); *H04N 5/23209* (2013.01)

(58) Field of Classification Search
CPC ...... G03B 9/70; G03B 15/05; G03B 2215/05; G03B 2215/0503; G03B 2215/0514;
(Continued)

(56) References Cited

U.S. PATENT DOCUMENTS 7,480,450 B2 * 1/2009 Kobayashi ............... G03B 7/16
396/56
8,264,597 B2 * 9/2012 Tohyama ............. H04N 5/2354
348/371
(Continued)

FOREIGN PATENT DOCUMENTS

JP     2010-185958 A    8/2010
JP     2010-185961 A    8/2010
(Continued)

*Primary Examiner* — Ngoc Yen T Vu
(74) *Attorney, Agent, or Firm* — Cowan, Liebowitz & Latman, P.C.

(57) ABSTRACT

An image capturing apparatus that controls a light emitting apparatus, performs communication with the light emitting apparatus at predetermined intervals, decides information regarding a period of time remaining before the light emitting apparatus emits light, based on the remaining time to exposure and a period of time from when the remaining time starts decreasing, to when the wireless communication unit performs a first wireless communication thereafter, and performs control so that the information regarding the decided period of time is transmitted to the light emitting apparatus through the first wireless communication with the light emitting apparatus. In a case where transmission and reception of the information regarding the period of time between the image capturing apparatus and the light emitting apparatus fail, the image capturing apparatus performs control so that the information regarding the period of time is re-transmitted.

16 Claims, 27 Drawing Sheets

(58) Field of Classification Search
CPC .. H04N 5/2256; H04N 5/2352; H04N 5/2353; H04N 5/2354; H04N 5/23206; H04N 5/23209
See application file for complete search history.

(56) References Cited

U.S. PATENT DOCUMENTS

| | | | |
|---|---|---|---|
| 8,768,158 B2* | 7/2014 | Hanayama | G03B 15/05 396/155 |
| 9,164,359 B2* | 10/2015 | Yano | G03B 15/05 |
| 2006/0284996 A1* | 12/2006 | Kanai | H04N 5/232 348/294 |

FOREIGN PATENT DOCUMENTS

| JP | 2011-242513 A | 12/2011 |
|---|---|---|
| JP | 2016-021020 A | 2/2016 |

* cited by examiner

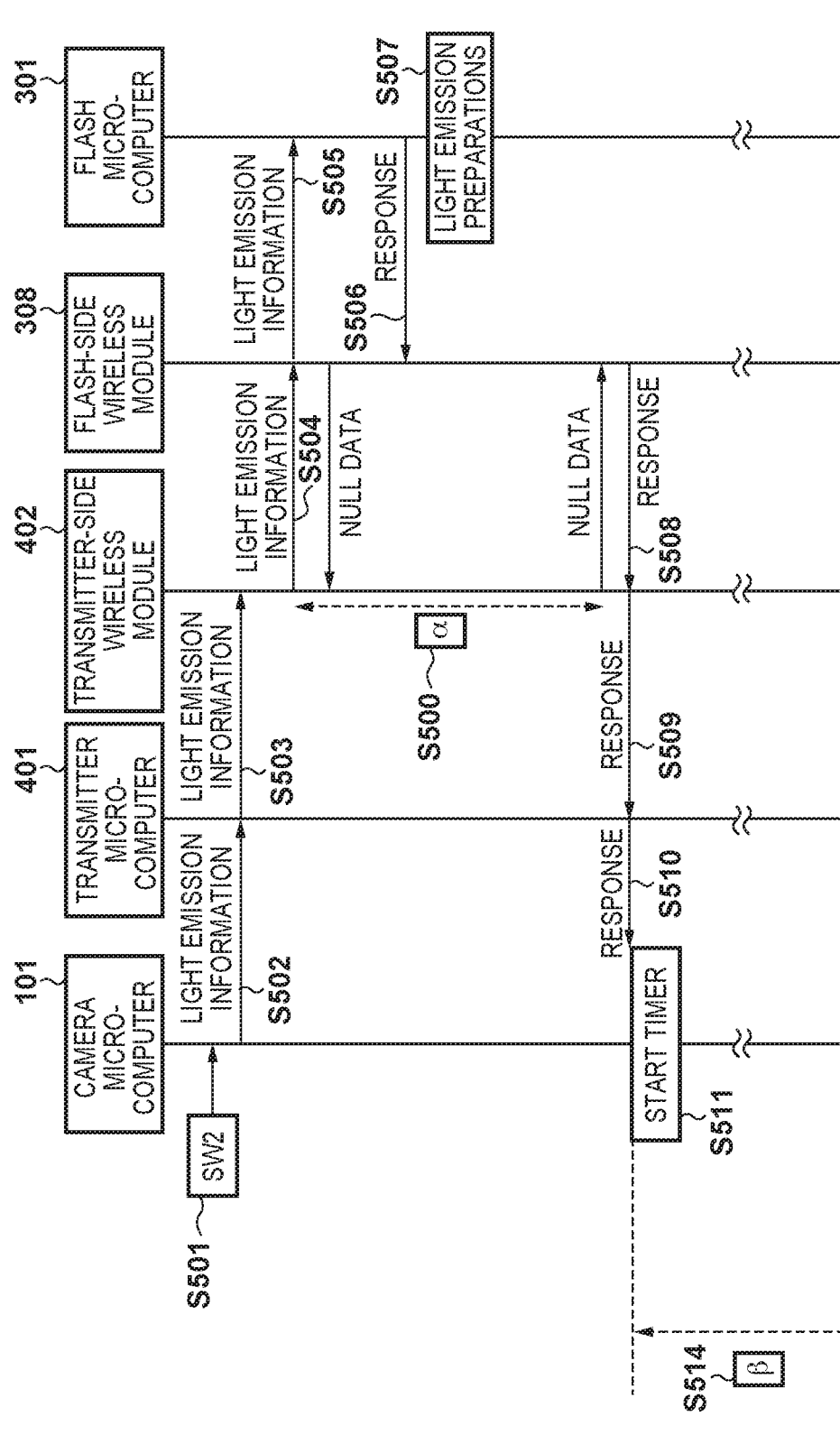

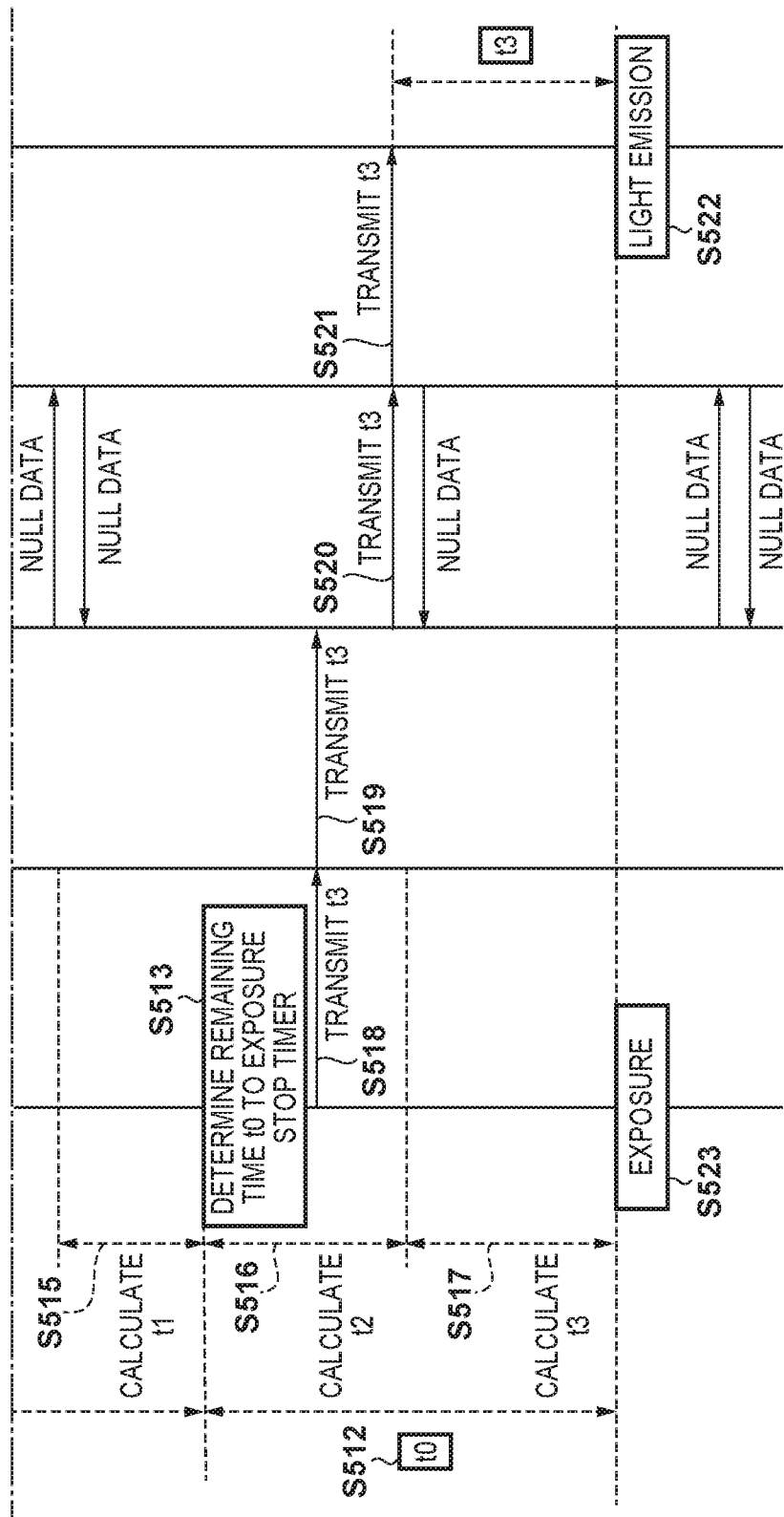

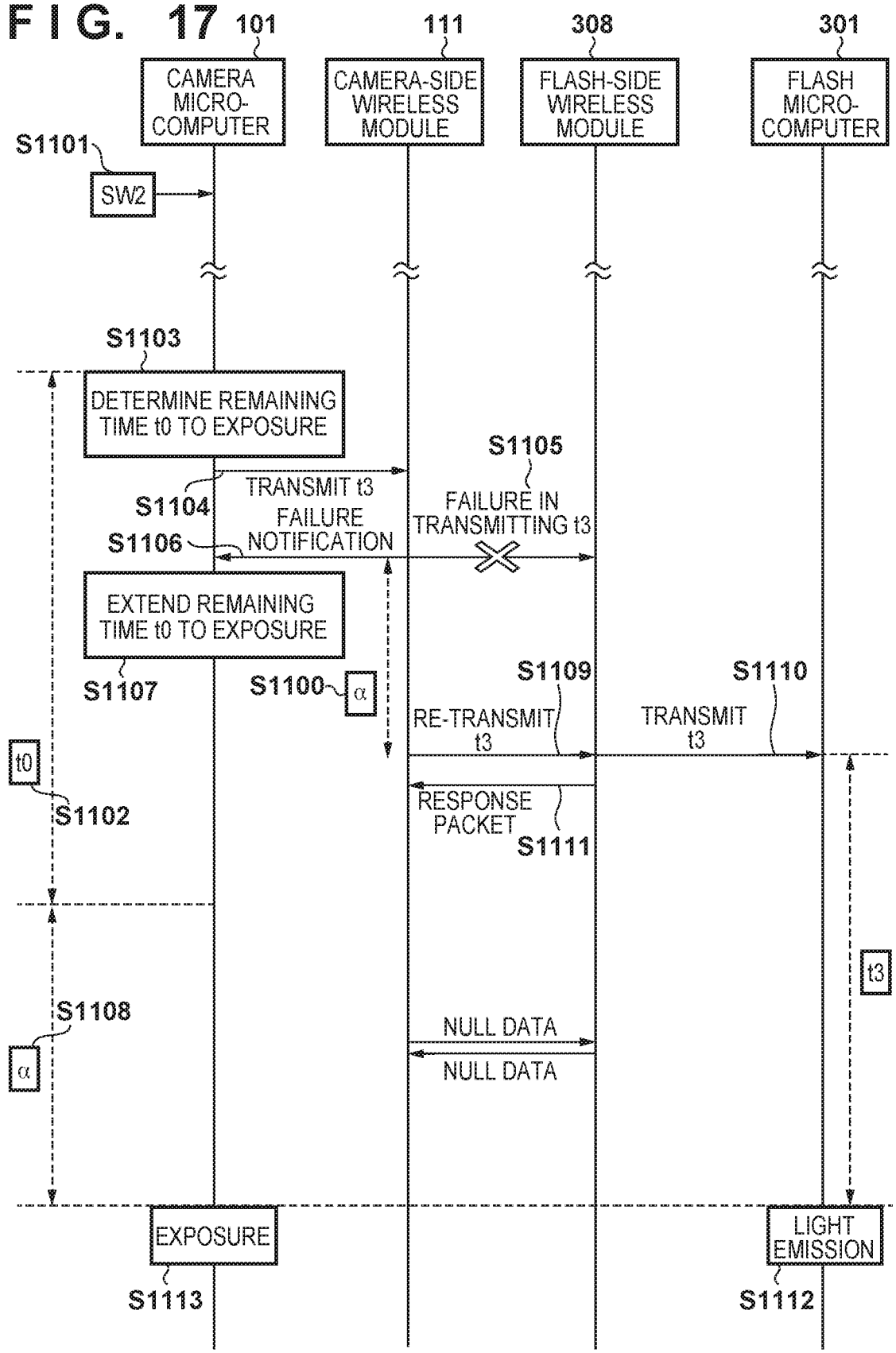

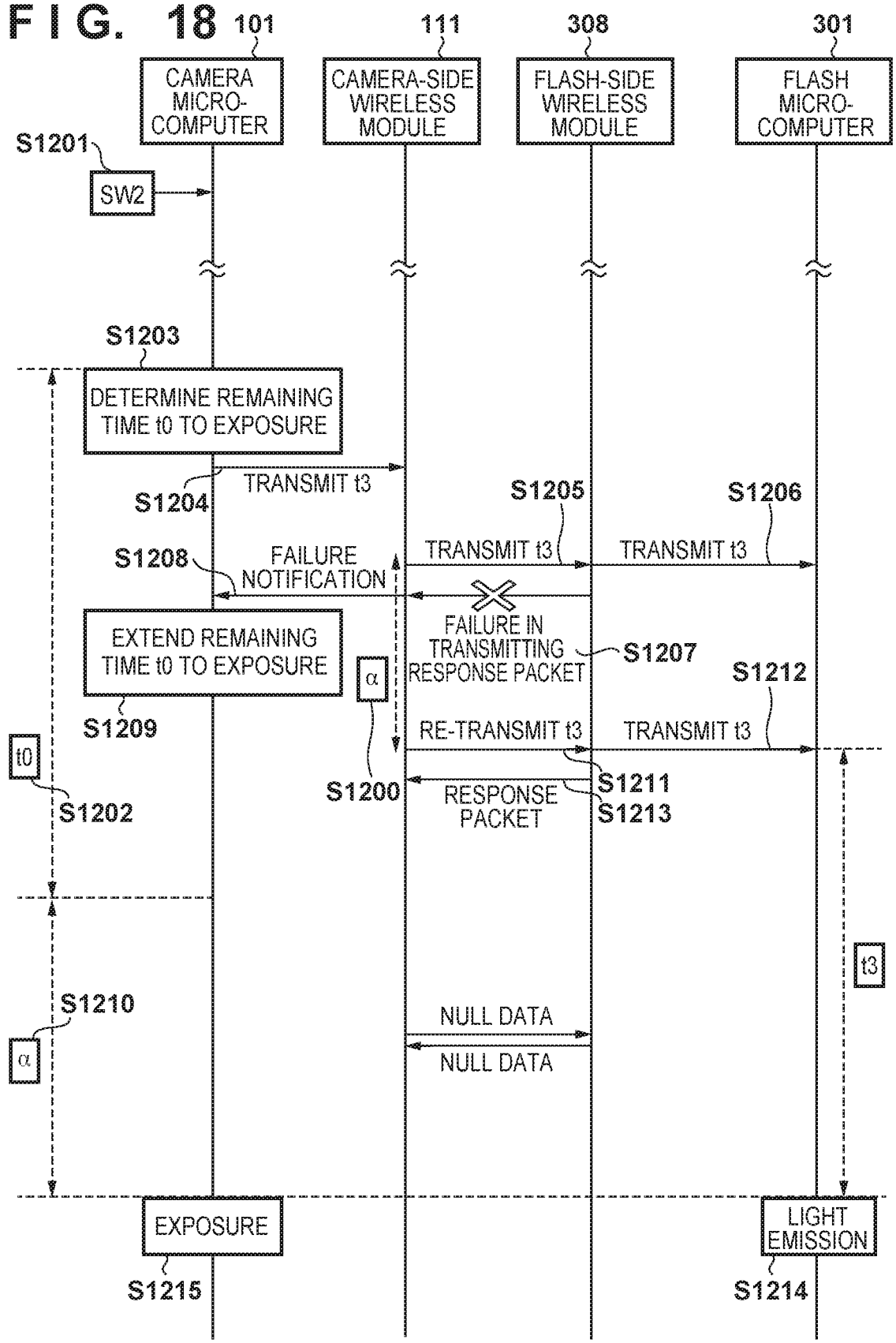

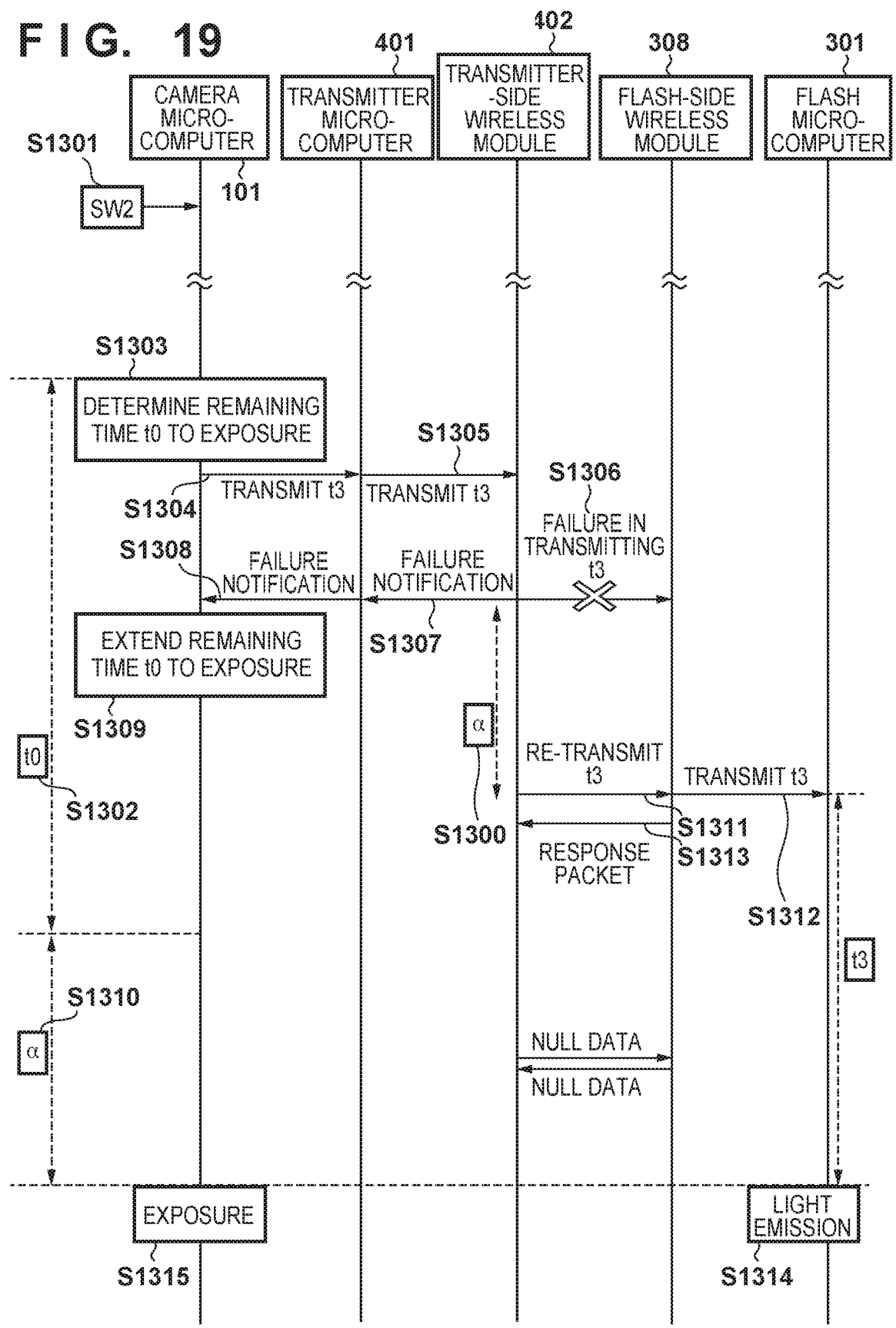

IMAGE CAPTURING APPARATUS, LIGHT EMITTING APPARATUS, AND CONTROL METHODS THEREOF

BACKGROUND OF THE INVENTION

Field of the Invention

The present invention relates to an image capturing apparatus, a light emitting apparatus, and control methods thereof, particularly relates to a technique that is employed by an image capturing apparatus to control, via wireless communication, light emission that is performed by a light emitting apparatus.

Description of the Related Art

In a system in which an image capturing apparatus such as a camera, and a light emitting apparatus such as a flash, are connected to each other via wireless communication, synchronization between exposure performed by the camera and light emission performed by the flash is established by the camera, transmitting light emission information, which contains information regarding the timing of light emission performed by the flash, to the flash (Japanese Patent Laid-Open No. 2010-185961, Japanese Patent Laid-Open No. 2016-021020, and Japanese Patent Laid-Open No. 2011-242513).

Also, Japanese Patent Laid-Open No. 2010-185958 discloses that, after a camera transmits a light-emission command, a flash transmits a response packet to the camera, and the flash emits light upon a predetermined period of time elapsing. In this case, if the camera does not receive a response packet from the flash within a predetermined period of time, it is determined that the camera has failed to transmit the light-emission command, but the camera transitions to a shooting operation without performing re-transmission processing.

Thus, in Japanese Patent Laid-Open No. 2010-185958, the camera does not perform re-transmission processing when the camera has failed to transmit the transmission of a light-emission command to the flash. Therefore, synchronization between exposure performed by the camera and light emission performed by the flash cannot be established.

SUMMARY OF THE INVENTION

The present invention has been made in consideration of the aforementioned problems, and realizes, even when necessary information is not transmitted and received between an image capturing apparatus and a light emitting apparatus, a technique for establishing synchronization between the timing of exposure performed by the image capturing apparatus and the timing of light emission performed by the light emitting apparatus in cases where a wireless communication scheme through which communication is performed at predetermined intervals is employed.

In order to solve the aforementioned problems, the present invention provides an image capturing apparatus that controls a light emitting apparatus, comprising: a wireless communication unit configured to perform communication with the light emitting apparatus at predetermined intervals; a deciding unit configured to, upon receiving an instruction to cause the light emitting apparatus to emit light to perform shooting, decide information regarding a period of time remaining before the light emitting apparatus emits light, based on the remaining time to exposure and a period of time from when the remaining time starts decreasing, to when the wireless communication unit performs a first wireless communication thereafter; and a control unit configured to perform control so that the information regarding the period of time decided by the deciding unit is transmitted to the light emitting apparatus through the first wireless communication with the light emitting apparatus, wherein, in a case where transmission and reception of the information regarding the period of time between the image capturing apparatus and the light emitting apparatus fail, the control unit performs control so that the information regarding the period of time is re-transmitted.

In order to solve the aforementioned problems, the present invention provides a light emitting apparatus that is controlled by an image capturing apparatus, comprising: a wireless communication unit configured to perform communication with the image capturing apparatus at predetermined intervals; and a deciding unit configured to, after receiving light emission information that is used to perform light emission preparations from the image capturing apparatus, receive time information regarding a period of time from when remaining time before the image capturing apparatus performs exposure starts decreasing, to when the wireless communication unit performs a first wireless communication thereafter, and obtain a period of waiting time remaining before the light emitting apparatus emits light, based on the information regarding the period of time, wherein, in a case where the deciding unit receives new time information after receiving the time information from the image capturing apparatus, the deciding unit cancels the period of waiting time decided based on the previously received time information, and decides a period of waiting time based on the newly received time information.

In order to solve the aforementioned problems, the present invention provides a method for controlling an image capturing apparatus that includes a wireless communication unit configured to communicate with a light emitting apparatus at predetermined intervals, and controls the light emitting apparatus via wireless communication, the method comprising: upon receiving an instruction to cause the light emitting apparatus to emit light to perform shooting, deciding time information regarding a period of time remaining before the light emitting apparatus emits light, based on the remaining time to exposure and a period of time from when the remaining time starts decreasing to when the image capturing apparatus performs the first wireless communication thereafter; and controlling such that the time information regarding the decided period of time is transmitted to the light emitting apparatus through the first wireless communication with the light emitting apparatus, wherein, in the controlling, in a case where transmission and reception of the time information between the image capturing apparatus and the light emitting apparatus fail, the control unit performs control so that the time information is re-transmitted.

In order to solve the aforementioned problems, the present invention provides a method for controlling a light emitting apparatus that includes a wireless communication unit configured to communicate with an image capturing apparatus at predetermined intervals, and is controlled by the image capturing apparatus via wireless communication, the method comprising: after receiving light emission information that is used to perform light emission preparations from the image capturing apparatus, receiving time information regarding a period of time from when remaining time before the image capturing apparatus performs exposure starts decreasing, to when the first wireless communication thereafter is to be performed, and obtaining a period of waiting time remaining before the light emitting apparatus emits light, based on the information regarding the period of time, wherein, in the obtaining, in a case where new time information is received after the time information has been received from the image capturing apparatus, the period of waiting time decided based on the previously received time information is cancelled, and a period of waiting time is decided based on the newly received time information.

In order to solve the aforementioned problems, the present invention provides a non-transitory computer-readable storage medium storing a program for causing a computer to execute a method for controlling an image capturing apparatus that includes a wireless communication unit configured to communicate with a light emitting apparatus at predetermined intervals, and controls the light emitting apparatus via wireless communication, the method comprising: upon receiving an instruction to cause the light emitting apparatus to emit light to perform shooting, deciding time information regarding a period of time remaining before the light emitting apparatus emits light, based on the remaining time to exposure and a period of time from when the remaining time starts decreasing to when the image capturing apparatus performs the first wireless communication thereafter; and controlling such that the time information regarding the decided period of time is transmitted to the light emitting apparatus through the first wireless communication with the light emitting apparatus, wherein, in the controlling, in a case where transmission and reception of the time information between the image capturing apparatus and the light emitting apparatus fail, the control unit performs control so that the time information is re-transmitted.

In order to solve the aforementioned problems, the present invention provides a non-transitory computer-readable storage medium storing a program for causing a computer to execute a method for controlling a light emitting apparatus that includes a wireless communication unit configured to communicate with an image capturing apparatus at predetermined intervals, and is controlled by the image capturing apparatus via wireless communication, the method comprising: after receiving light emission information that is used to perform light emission preparations from the image capturing apparatus, receiving time information regarding a period of time from when remaining time before the image capturing apparatus performs exposure starts decreasing, to when the first wireless communication thereafter is to be performed, and obtaining a period of waiting time remaining before the light emitting apparatus emits light, based on the information regarding the period of time, wherein, in the obtaining, in a case where new time information is received after the time information has been received from the image capturing apparatus, the period of waiting time decided based on the previously received time information is cancelled, and a period of waiting time is decided based on the newly received time information.

According to the present invention, it is possible to, even when necessary information is not transmitted and received between an image capturing apparatus and a light emitting apparatus, establish synchronization between the timing of exposure performed by the image capturing apparatus and the timing of light emission performed by the light emitting apparatus in cases where a wireless communication scheme through which communication is performed at predetermined intervals is employed.

Further features of the present invention will become apparent from the following description of exemplary embodiments with reference to the attached drawings.

BRIEF DESCRIPTION OF THE DRAWINGS

FIGS. 8A and 8B are sequence diagrams illustrating operations performed during flash synchronization shooting according to the fifth embodiment.

FIGS. 17 and 18 are sequence diagrams illustrating operations performed during flash synchronization shooting according to an eleventh embodiment.

FIG. 19 is a sequence diagram illustrating operations performed during flash synchronization shooting according to a twelfth embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a flash synchronization shooting system according to a first embodiment.

Figure 1:
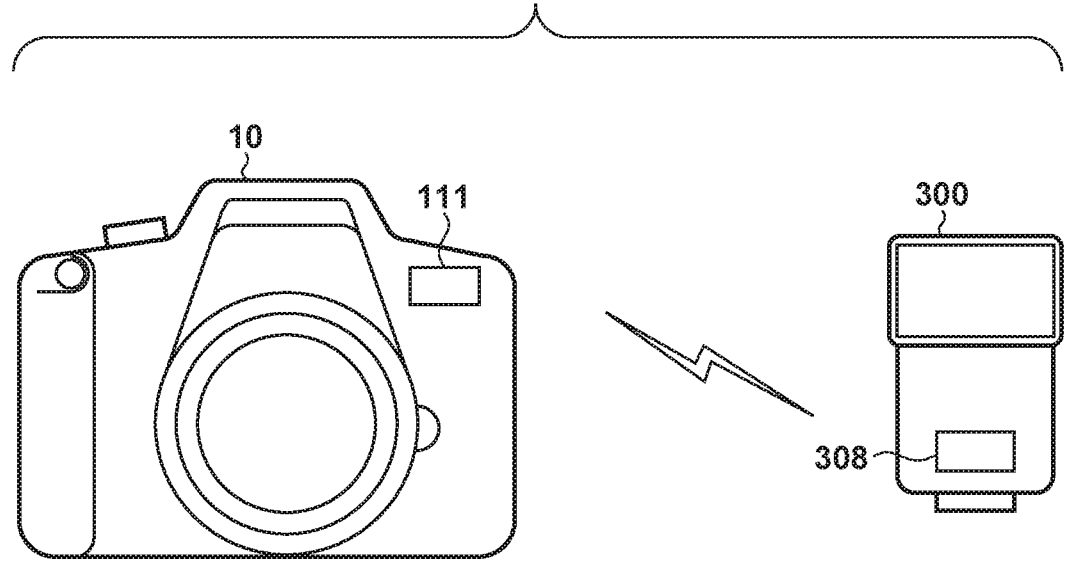
FIG. 1 is a diagram showing an example of a flash synchronization shooting system according to a first embodiment.

FIG. 1 is a diagram showing an example of a flash synchronization shooting system according to the present embodiment. The flash synchronization shooting system according to the present embodiment is applicable to shooting that involves a flash that performs wireless communication with a digital camera or a film camera. A camera 10, which is an image capturing apparatus, controls a flash 300, which is a light emitting apparatus, via wireless communication. The wireless communication scheme employed herein is a short-range wireless communication scheme such as Bluetooth (registered trademark). The camera 10 is a digital single-lens reflex camera, for example. The present embodiment is applicable to shooting that involves a flash that performs wireless communication with a camera, which is not limited to a digital camera, but may be a film camera. A wireless communication unit 111 is built into the camera 10. A wireless communication unit 308 is built into the flash 300. When the camera 10 and the flash 300 are set to a wireless communication mode, the camera 10 operates as a master and the flash 300 operates as a slave, and thus the camera 10 and the flash 300 can transmit/receive data to/from each other via the wireless communication units 111 and 308.

Figure 2A:
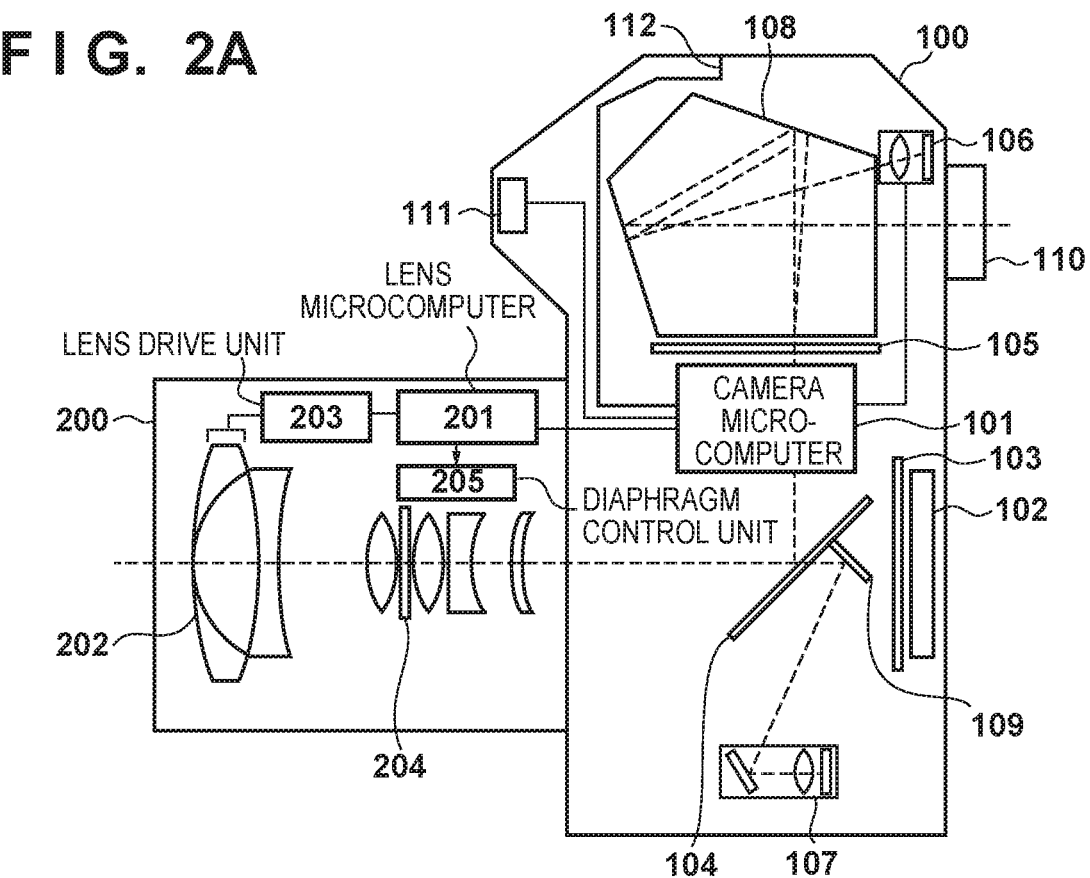
FIG. 2A is a block diagram showing an example of a configuration of a camera body according to the first embodiment.

FIG. 2A is a block diagram showing a configuration of the camera 10 according to the present embodiment. The camera 10 according to the present embodiment includes a camera body 100 and a lens unit 200.

First, the following describes the configuration and the functions of the camera body 100.

In the camera body 100, a microcomputer (hereinafter referred to as a "camera microcomputer") 101 executes control programs such as firmware to control operations of each of the components included in the camera body 100.

The camera microcomputer 101 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

An image sensor 102 includes an image capturing device such as a CCD or a CMOS, which includes an infrared cut filter and a low pass filter, and a lens group 202 forms an optical image of a subject during a shooting operation.

A shutter 103 is closed during a shooting preparation operation, to block light from entering the image sensor 102, and is open during a shooting operation, to guide a light ray to the image sensor 102.

A main mirror (semitransparent mirror) 104 reflects off incident light from the lens group 202 during the shooting preparation operation, and forms an image on a focusing screen 105.

An image of the subject is formed on the focusing screen 105 due to a light ray reflected off the main mirror 104. A photometric unit 106 includes an image forming lens and a photometric sensor. A shooting area of the subject is divided into a plurality of areas, and the photometric sensor performs light metering for each of the areas. The photometric sensor detects the amount of light received from the subject image formed on the focusing screen 105, via a pentaprism 108.

A focus detection unit 107 functions as a focus detection optical system. The focus detection unit 107 includes a secondary image forming mirror, a secondary image forming lens, a focus detection sensor, and so on. The focus detection sensor has a plurality of focus detection areas, and the focus detection areas are respectively included in the divisional areas of the photometric sensor.

Note that the camera body 100 has a recording medium such as a memory card or a hard disk (not shown), which is used to record captured images, and is built into, or is detachable from, the camera body 100.

The pentaprism 108 guides the subject image formed on the focusing screen 105 to the photometric sensor of the photometric unit 106, and to an optical viewfinder 110.

A sub mirror 109 guides a light ray that has entered from the lens group 202 and has passed through the main mirror 104, to the focus detection sensor of the focus detection unit 107.

The optical viewfinder 110 allows a photographer looking into the optical viewfinder 110 to visually check the focus state of the subject image.

The wireless communication unit 111 performs predetermined wireless communication with camera accessories such as a flash and a remote control, which are external apparatuses. It is envisaged that the wireless communication unit 111 is a wireless module, a functional unit provided in the camera microcomputer 101, or the like. In the present embodiment, the wireless communication unit 111 is a wireless module. The camera-side wireless module 111 is provided with an antenna for wireless communication, and realizes short-range wireless communication conforming to the IEEE 802.15 standard (Bluetooth (registered trademark)). The camera-side wireless module 111 performs wireless communication with an external apparatus such as a flash or a remote control at predetermined intervals, and notifies the camera microcomputer 101 of the points in time at which the camera-side wireless module 111 received null data or non-null data.

The camera body 100) also includes a camera-side interface (IF) 112, and transmits/receives data to/from the camera microcomputer 101 via the camera-side interface 112.

Upon an external apparatus such as the flash 300 or a transmitter 400 described below being attached to an accessory shoe (not shown) of the camera body 100, the camera-side interface 112 is connected to a flash-side interface 309 of the flash 300 or a transmitter-side interface 403 of the transmitter 400. As a result, the camera microcomputer 101 can communicate with a flash microcomputer 301 or a transmitter microcomputer 401.

Next, the following describes the configuration and functions of the lens unit 20).

In the lens unit 200, a microcomputer (hereinafter referred to as a "lens microcomputer") 201 executes control programs such as firmware to control operations of each of the components included in the lens unit 200.

The lens microcomputer 201 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

The lens group 202 includes a plurality of lenses such as a zoom lens and a focus lens.

A lens drive unit 203 moves an optical system for adjusting a focal position of the lens group 202.

The lens microcomputer 201 controls a diaphragm 204, using a diaphragm control unit 205.

Note that the focal point distance of the lens group 202 may be a single focal point distance, or variable like that of a zoom lens.

Figure 2B:
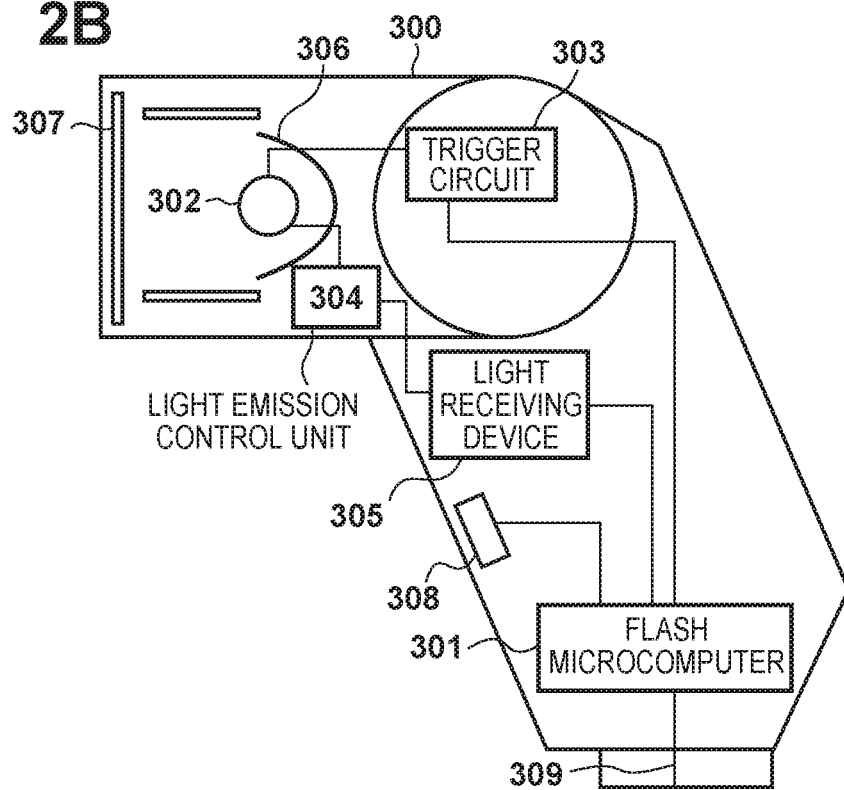
FIG. 2B is a block diagram showing an example of a configuration of a flash according to the first embodiment.

Next, the following describes the configuration and functions of the flash 300 with reference to FIG. 2B.

In the flash 300, the microcomputer (hereinafter referred to as the "flash microcomputer") 301 executes control programs such as firmware to control operations of each of the components included in the flash 300.

The flash microcomputer 301 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

A light emitting unit 302 is a xenon tube, for example, and emits light upon a pulse voltage of several kilovolts being applied from a trigger circuit 303 to a main capacitor (not shown) and xenon being excited by energy that has been charged in the main capacitor, and irradiates the subject with the light.

The trigger circuit 303 receives a trigger signal pulse output from the flash microcomputer 301 at the time of light emission.

A light emission control unit 304 controls the start and end of light emission performed by the light emitting unit 302, in conjunction with the trigger circuit 303.

A light receiving device 305 is a photodiode or the like that receives an amount of light from the light emitting unit 302, and receives light from the light emitting unit 302 directly or via an optical fiber (not shown).

A reflector 306 and a Fresnel lens 307 each efficiently collect light from the light emitting unit 302 toward the subject.

The wireless communication unit 308 performs wireless communication with the camera body 100. It is envisaged that the wireless communication unit 308 is a wireless module, a functional unit provided in the flash microcomputer 301, or the like. In the present embodiment, the wireless communication unit 308 is a wireless module. The flash-side wireless module 308 is provided with an antenna for wireless communication, and realizes short-range wireless communication conforming to the IEEE 802.15 standard (Bluetooth (registered trademark)). The flash-side wireless module 308 performs wireless communication with the camera body 100 at predetermined intervals, and notifies the flash microcomputer 301 of the points in time at which the flash-side wireless module 308 received null data or non-null data.

The flash 300 includes the flash-side interface 309, and transmits/receives data to/from the flash microcomputer 301 via the flash-side interface 309. Note that when the flash 300 is attached to the accessory shoe (not shown) of the camera body 100, the flash 300 operates as a master, and performs wireless communication with other flashes that operate as slaves.

Upon the flash 300 being attached to the accessory shoe (not shown) of the camera body 100, the flash-side interface 309 is connected to the camera-side interface 112 of the camera body 100. As a result, the flash microcomputer 301 can communicate with the camera microcomputer 101.

Figure 3:
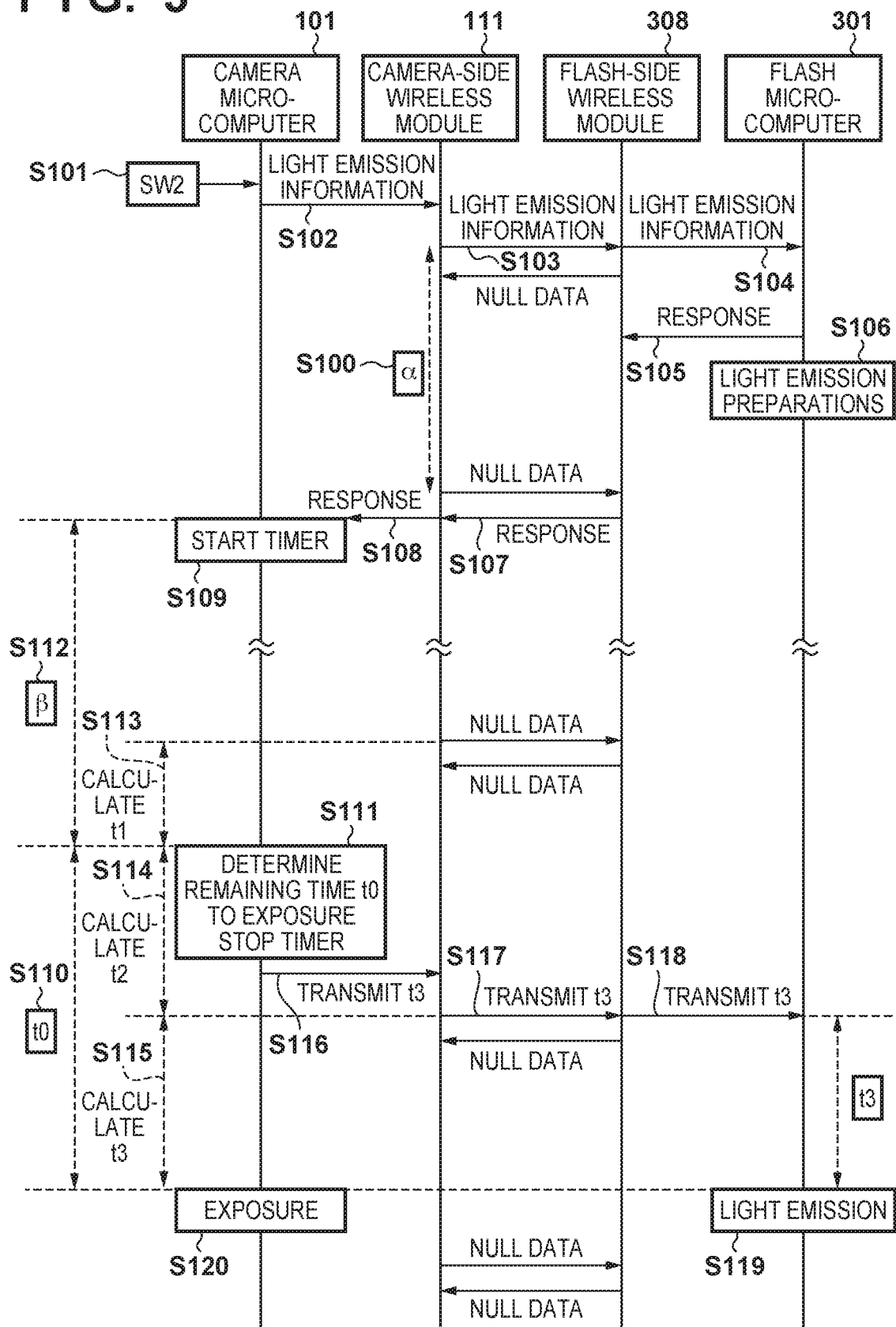
FIG. 3 is a sequence diagram illustrating operations performed during flash synchronization shooting according to the first embodiment.

Next, with reference to FIG. 3, the following describes an operation sequence of flash synchronization shooting in a case where the camera body 100 and the flash 300 perform one-to-one communication as shown in FIG. 1.

In step S100, the camera-side wireless module 111 and the flash-side wireless module 308 perform wireless communication at predetermined intervals (intervals α) asynchronously with the camera microcomputer 101 or the flash microcomputer 301. If there is no data to be transmitted, the camera-side wireless module 111 and the flash-side wireless module 308 transmit/receive null data to/from each other. The camera-side wireless module 111 and the flash-side wireless module 308 respectively notify the camera microcomputer 101 and flash microcomputer 301 of the points in time at which the camera-side wireless module 111 and the flash-side wireless module 308 received non-null data.

Upon the camera 10 being powered ON, if the flash has been set to the flash shooting mode, the camera microcomputer 101 controls and sets the camera-side wireless module 111 so that the camera-side wireless module 111 can receive terminal information regarding the flash 300, which is a communication partner. Upon the flash 300 being powered ON, the flash microcomputer 301 controls the flash-side wireless module 308 to set a wireless frequency channel that is to be used, and transmits terminal information regarding the flash 300.

Upon receiving terminal information regarding the flash 300, the camera 10 issues a connection request to the flash 300, and then the camera 10 and the flash 300 transmit/receive apparatus information and the like to/from each other. As a result, the camera 10 and the flash 300 can communicate with each other at the predetermined communication intervals α. After the camera 10 and the flash 300 have become able to communicate with each other in this way, the camera microcomputer 101 enters a state in which the camera microcomputer 101 waits for a shutter release operation that is performed by the photographer (a shooting standby state).

Upon a shutter button (not shown) being pressed halfway down (a shooting preparation instruction), the camera microcomputer 101 generates a first signal SW1. Upon receiving the first signal SW1, the camera microcomputer 101 starts shooting preparation operations to perform AF (Automatic Focus) processing, AE (Automatic Exposure) processing, AWB (Automatic White Balance) processing, EF (pre-flash emission) processing, and so on. Upon the shutter button being fully pressed down (a shooting instruction), the camera microcomputer 101 generates a second signal SW2. Upon receiving the second signal SW2, the camera microcomputer 101 starts a series of shooting operations that start with reading of image signals out of the image sensor 102 and end with writing of image data to a recording medium.

Upon the second signal SW2 being turned ON in step S101, the camera microcomputer 101 outputs, in step S102, light emission information, which contains, for example, information regarding the amount of light to be emitted and the light emission mode of the flash 300, to the camera-side wireless module 111.

In step S103, upon the time to start wireless communication being reached, the camera-side wireless module 111 transmits light emission information to the flash-side wireless module 308. In this case, wireless communication between the camera-side wireless module 111 and the flash-side wireless module 308 does not synchronize with the camera microcomputer 101 or the flash microcomputer 301. Therefore, the timing at which the camera microcomputer 101 output light emission information to the camera-side wireless module 111 in step S102 does not necessarily coincide with the timing at which the camera-side wireless module 111 transmitted light emission information to the flash-side wireless module 308 in step S103.

In step S104, the flash-side wireless module 308 outputs the light emission information received from the camera-side wireless module 111 to the flash microcomputer 301.

In step S105, the flash microcomputer 301 outputs a response to the light emission information to the flash-side wireless module 308, and in step S106, the flash microcomputer 301 starts light emission preparation operations based on the light emission information.

In step S107, upon the time to start wireless communication being reached, the flash-side wireless module 308 transmits a response to the camera-side wireless module 111.

In step S108, the camera-side wireless module 111 notifies the camera microcomputer 101 of the timing at which the camera-side wireless module 111 received the response from the flash-side wireless module 308.

In step S109, after receiving the response notification from the camera-side wireless module 111, the camera microcomputer 101 starts a timer of the camera microcomputer 101.

In step S110, the camera microcomputer 101 performs control such as diaphragm driving control and mirror lifting up control. Upon completion of processing for control such as diaphragm driving control and mirror lifting up control, which varies depending on shooting conditions, the remaining time to exposure is set to t0.

Upon the remaining time t0 to exposure being determined, the camera microcomputer 101 stops the timer in step S111, and acquires a timer value (a period of time) β in step S112.

In step S113, the camera microcomputer 101 divides the period of time β acquired in step S112 by the predetermined communication interval α, and the quotient thus obtained is the number of times wireless communication was performed during the period of time β, and the remainder is the period of time from when the last wireless communication was performed to when the timer was stopped. If this remainder is expressed as t1, t1 is the period of time from when the wireless communication immediately before t0 was determined in step S111 was performed, to when t0 was determined.

In step S114, the camera microcomputer 101 subtracts t1, obtained in step S111, from the predetermined communication interval α, to obtain a period of time t2, which is a period of time from when t0 was determined to when the subsequent wireless communication is to be performed.

In step S115, the camera microcomputer 101 subtracts t2, obtained in step S114, from the remaining time t0 to exposure, determined in step S110, to obtain a period of time t3, which is a period of time from when the first wireless communication after t0 was determined is to be performed, to when exposure (light emission) is to be performed.

In step S116, the camera microcomputer 101 outputs information regarding the period of time t3, calculated in step S115, to the camera-side wireless module 111.

In step S117, upon the time to perform wireless communication being reached, the camera-side wireless module 111 transmits information regarding the period of time t3 to the flash-side wireless module 308.

In step S118, the flash-side wireless module 308 outputs information regarding the period of time t3, received from the camera-side wireless module 111, to the flash microcomputer 301 as light emission information.

In step S119, the flash microcomputer 301 sets t3, received from the flash-side wireless module 308, as the period of waiting time, and upon the period of time t3 elapsing, the flash microcomputer 301 performs light emission based on information regarding the light emission preparations performed in step S106.

In step S120, the camera microcomputer 101 performs exposure upon the period of time t0, i.e. t2+t3, elapsing after step S111 has been completed. As a result, the camera 10 and the flash 300 synchronize with each other.

Upon the shooting sequence being complete in this way, the camera microcomputer 101 and the flash microcomputer 301 return to the shooting standby state.

As described above, the camera microcomputer 101 is notified by the camera-side wireless module 111 of the timing at which light emission information was received (step S108). Thus, the camera microcomputer 101 can find out the timing of performing wireless communication with the flash 300, and decide information regarding the period of time t3, which is a period of time from when the wireless communication is performed to when the flash 300 emits light. As a result, even in a case where the camera 10 and the flash 300 perform asynchronous wireless communication, it is possible to establish synchronization between the timing of exposure performed by the camera 10 and the timing of light emission performed by the flash 300.

Note that even in a case where light metering and pre-flash emission are respectively performed by the camera 10 and the flash 300 after the second signal SW2 has been turned ON in step S101, it is possible to establish synchronization between light metering performed by the camera 10 and pre-flash emission performed by the flash 300, in the same manner as in the case of exposure performed by the camera 10 and light emission performed by the flash 300.

Second Embodiment

The following describes a flash synchronization shooting system according to a second embodiment.

Figure 4:
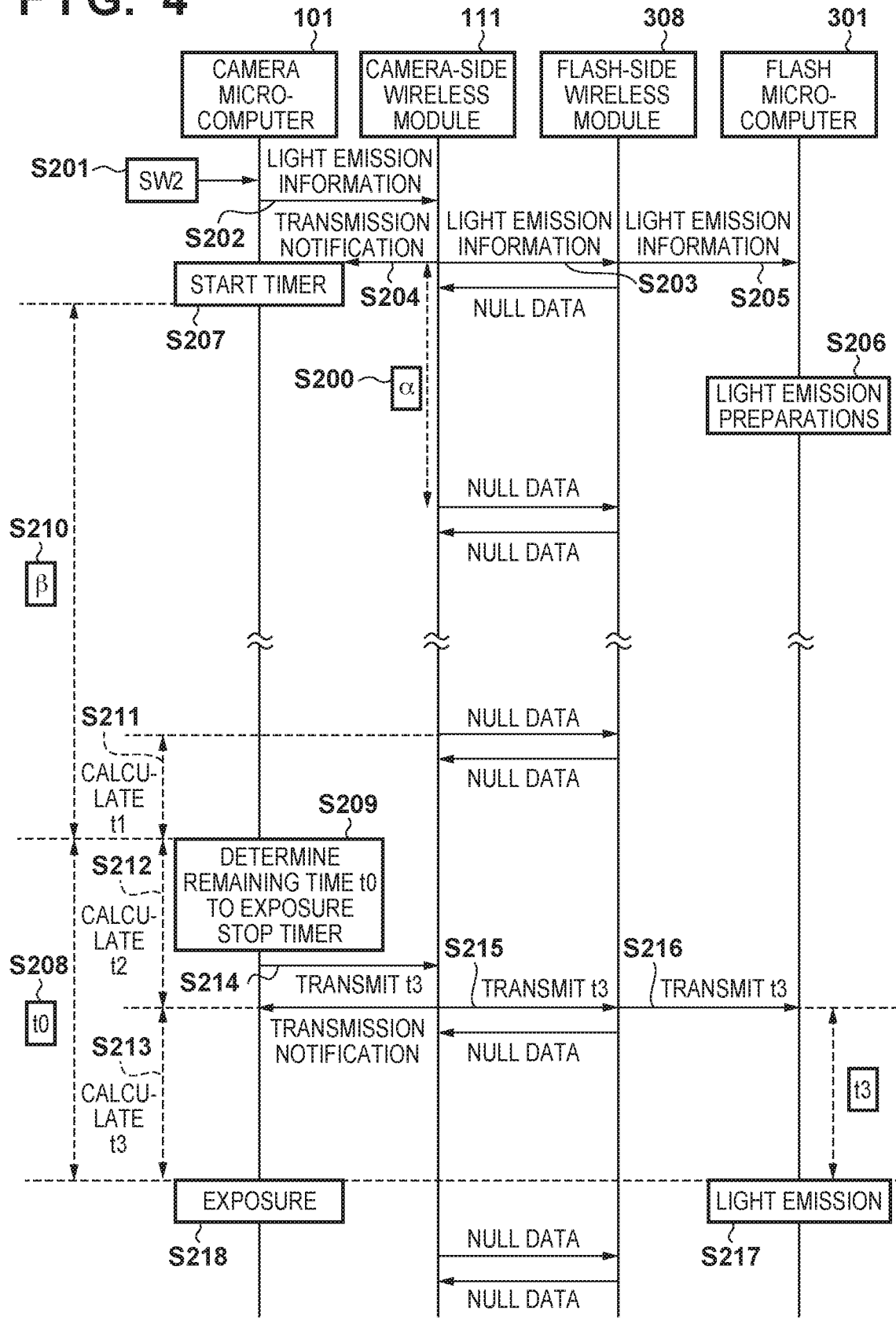
FIG. 4 is a sequence diagram illustrating operations performed during flash synchronization shooting according to a second embodiment.

FIG. 4 is a diagram illustrating an operation sequence of flash synchronization shooting in a case where the camera 10 and the flash 300 perform one-to-one communication as shown in FIG. 1.

The camera-side wireless module 111 according to the second embodiment notifies the camera microcomputer 101 of the points in time at which the camera-side wireless module 111 transmitted non-null data. Similarly, the flash-side wireless module 308 notifies the flash microcomputer 301 of the points in time at which the flash-side wireless module 308 received non-null data.

Note that the configurations of the camera 10 and the flash 300 are the same as the configurations of those shown in FIGS. 2A and 2B according to the first embodiment. Also, the wireless communication scheme employed by the camera-side wireless module 111 and the flash-side wireless module 308, and the operations of the camera body 100 performed until the second signal SW2 is turned ON are the same as those according to the first embodiment.

Upon the second signal SW2 being turned ON in step S201, the camera microcomputer 101 outputs, in step S202, light emission information, which contains, for example, information regarding the amount of light to be emitted and the light emission mode of the flash 300, to the camera-side wireless module 111.

In step S203, upon the time to start wireless communication being reached, the camera-side wireless module 111 transmits light emission information to the flash-side wireless module 308. In step S204, the camera-side wireless module 111 outputs a transmission notification to the camera microcomputer 101. In this case, wireless communication between the camera-side wireless module 111 and the flash-side wireless module 308 does not synchronize with the camera microcomputer 101 or the flash microcomputer 301. Therefore, the timing at which the camera microcomputer 101 output light emission information to the camera-side wireless module 111 in step S202 does not necessarily coincide with the timing at which the camera-side wireless module 111 transmitted light emission information to the flash-side wireless module 308 in step S203.

In step S205, the flash-side wireless module 308 outputs the light emission information received from the camera-side wireless module 111 to the flash microcomputer 301.

In step S206, the flash microcomputer 301 starts light emission preparation operations based on the light emission information.

In step S207, after receiving the transmission notification from the camera-side wireless module 111, the camera microcomputer 101 starts the timer of the camera microcomputer 101.

Steps S208 to S218 are the same as steps S110 to S120 in FIG. 3 according to the first embodiment, and therefore descriptions thereof are omitted.

Upon the shooting sequence being complete in this way, the camera microcomputer 101 and the flash microcomputer 301 return to the shooting standby state.

As described above, the camera microcomputer 101 is notified by the camera-side wireless module 111 of the timing at which light emission information was transmitted (step S204). Thus, the camera microcomputer 101 can find out the timing of performing wireless communication with the flash 300, and decide information regarding the period of time t3, which is a period of time from when the wireless communication is performed to when the flash 300 emits light. As a result, even in a case where the camera 10 and the flash 300 perform asynchronous wireless communication, it is possible to establish synchronization between the timing of exposure performed by the camera 10 and the timing of light emission performed by the flash 300.

Note that even in a case where light metering and pre-flash emission are respectively performed by the camera 10 and the flash 300 after the second signal SW2 has been turned ON in step S201, it is possible to establish synchronization between light metering performed by the camera 10 and pre-flash emission performed by the flash 300, in the same manner as in the case of exposure performed by the camera 10 and light emission performed by the flash 300.

Third Embodiment

The following describes a flash synchronization shooting system according to a third embodiment.

Figure 5:
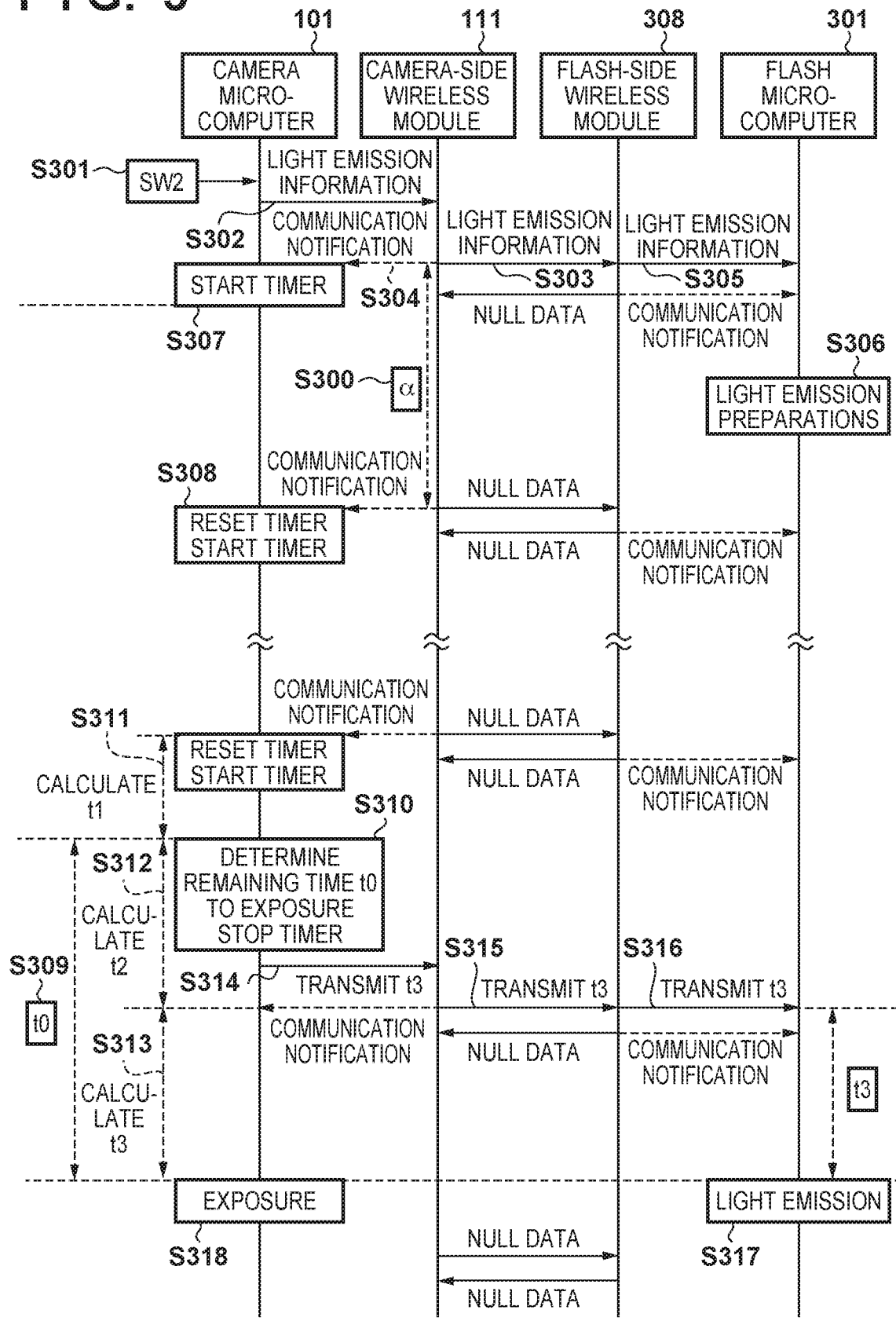
FIG. 5 is a sequence diagram illustrating operations performed during flash synchronization shooting according to a third embodiment.

FIG. 5 is a diagram illustrating an operation sequence of flash synchronization shooting in a case where the camera 10 and the flash 300 perform one-to-one communication as shown in FIG. 1.

The camera-side wireless module 111 according to the third embodiment notifies the camera microcomputer 101 of the points in time at which the camera-side wireless module 111 transmitted data, which may be null data. Similarly, the flash-side wireless module 308 notifies the flash microcomputer 301 of the points in time at which the flash-side wireless module 308 received data, which may be null data. The configurations of the camera 10 and the flash 300 are the same as the configurations of those shown in FIGS. 2A and 2B according to the first embodiment. Also, the wireless communication scheme employed by the camera-side wireless module 111 and the flash-side wireless module 308, and the operations of the camera body 100 performed until the second signal SW2 is turned ON are the same as those according to the first embodiment.

Also, steps S301 to S307 are the same as steps S201 to S207 according to the second embodiment, and therefore descriptions thereof are omitted.

In step S308, the camera microcomputer 101 resets and starts the timer every time the camera microcomputer 101 receives a communication notification from the camera-side wireless module 111.

After determining the remaining time t0 to exposure in step S309, the camera microcomputer 101 stops the timer in step S310 and acquires the value of the timer. Then, in step S311, the camera microcomputer 101 sets the timer value to t1, which is the period of time from when the wireless communication was performed immediately before the remaining time t0 to exposure was determined, to when the remaining time t0 to exposure was determined.

Steps S312 to S318 are the same as steps S114 to S120 in FIG. 3 according to the first embodiment, and therefore descriptions thereof are omitted.

Upon the shooting sequence being complete in this way, the camera microcomputer 101 and the flash microcomputer 301 return to the shooting standby state.

As described above, the camera microcomputer 101 is notified by the camera-side wireless module 111 of the timing of performing wireless communication (step S304). Thus, the camera microcomputer 101 can find out the timing of performing wireless communication with the flash 300, and decide information regarding the period of time t3, which is a period of time from when the wireless communication is performed to when the flash 300 emits light. As a result, even in a case where the camera 10 and the flash 300 perform asynchronous wireless communication, it is possible to establish synchronization between exposure performed by the camera 10 and light emission performed by the flash 300.

Note that even in a case where light metering and pre-flash emission are respectively performed by the camera 10 and the flash 300 after the second signal SW2 has been turned ON in step S301, it is possible to establish synchronization between light metering performed by the camera 10 and pre-flash emission performed by the flash 300, in the same manner as in the case of exposure performed by the camera 10 and light emission performed by the flash 300.

Fourth Embodiment

The following describes a flash synchronization shooting system according to a fourth embodiment.

Figure 6:
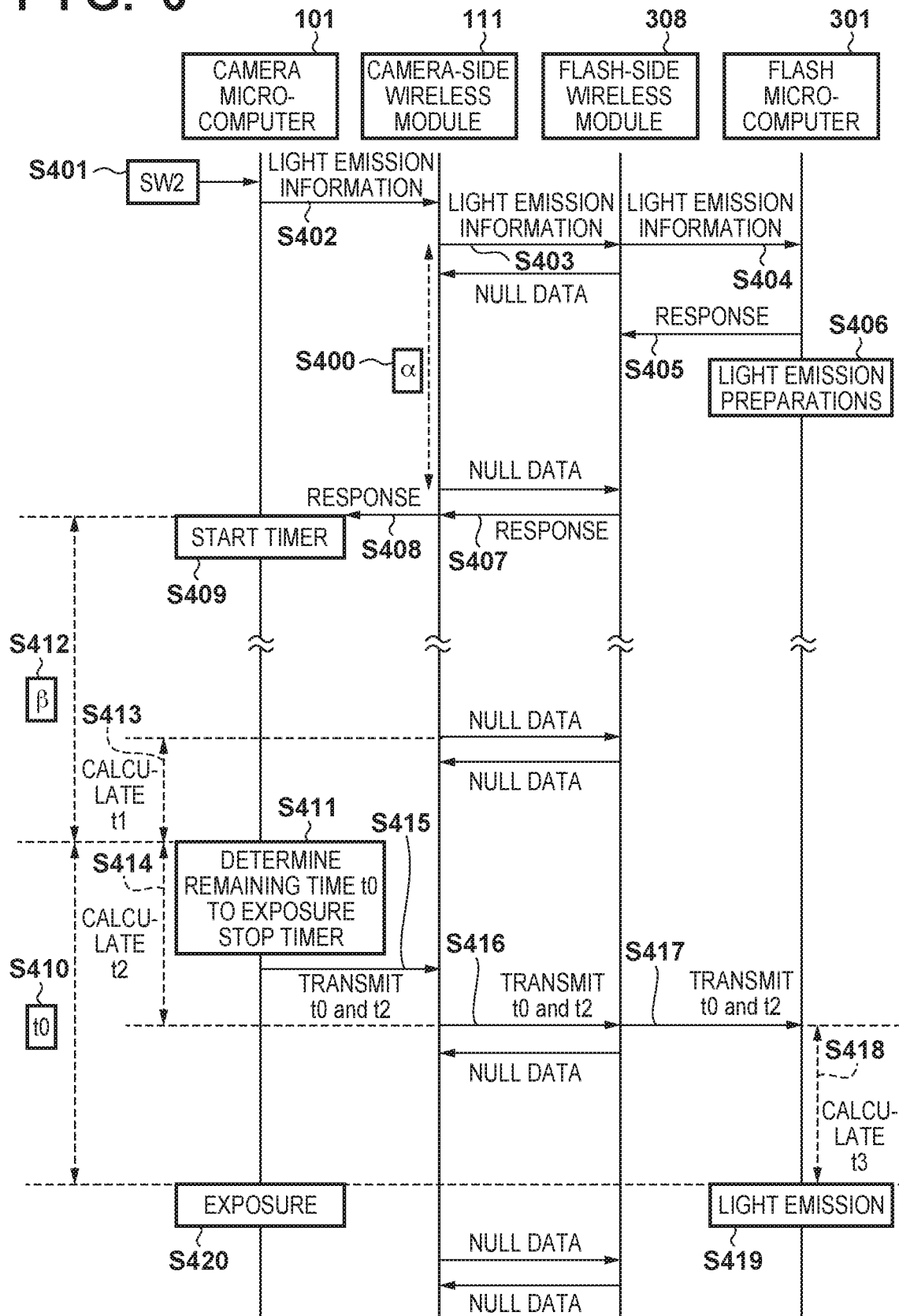
FIG. 6 is a sequence diagram illustrating operations performed during flash synchronization shooting according to a fourth embodiment.

FIG. 6 is a diagram illustrating an operation sequence of flash synchronization shooting in a case where the camera 10 and the flash 300 perform one-to-one communication as shown in FIG. 1.

In the present embodiment, the camera 10 transmits, to the flash 300, information that is required to calculate the period of time remaining before the flash 300 emits light, and the flash 300 calculates the period of time t3, which is a period of time from when the flash 300 performs wireless communication to when the flash 300 emits light.

Note that, in the fourth embodiment, the configurations of the camera 10 and the flash 300, the wireless communication scheme employed by the camera-side wireless module 111 and the flash-side wireless module 308, and the operations of the camera body 100 performed until the second signal SW2 is turned ON are the same as those shown in FIGS. 2A, 2B, and 3 according to the first embodiment.

Also, steps S401 to S414 are the same as steps S101 to S114 in FIG. 3 according to the first embodiment, and therefore descriptions thereof are omitted.

In step S415, the camera microcomputer 101 transmits, to the camera-side wireless module 111, the remaining time t0 to exposure determined in step S410 and t2 obtained in step S413.

In step S416, upon the time to start wireless communication being reached, the camera-side wireless module 111 transmits t0 and t2 to the flash-side wireless module 308.

In step S417, the flash-side wireless module 308 outputs t0 and t2 received from the camera-side wireless module 111, to the flash microcomputer 301.

In step S418, the flash microcomputer 301 calculates the period of time t3 remaining before light emission, by subtracting t0 from t2.

In step S419, the flash microcomputer 301 sets t3, received from the flash-side wireless module 308, as the period of waiting time, and upon the period of time t3 elapsing, the flash microcomputer 301 performs light emission based on information regarding the light emission preparations performed in step S406.

In step S420, the camera microcomputer 101 performs exposure upon the period of time t0, i.e. t2+t3, elapsing after step S411 has been completed. As a result, the camera 10 and flash 300 synchronize with each other.

Upon the shooting sequence being complete in this way, the camera microcomputer 101 and the flash microcomputer 301 return to the shooting standby state.

As described above, the camera microcomputer 101 transmits, to the flash 300, information that is required to calculate the period of time remaining before the flash 300 emits light, and thus the flash microcomputer 301 can decide information regarding the period of time t3, which is a period of time from when the wireless communication is performed to when the flash 300 emits light. As a result, even in a case where the camera 10 and the flash 300 perform asynchronous wireless communication, it is possible to establish synchronization between the timing of exposure performed by the camera 10 and the timing of light emission performed by the flash 300.

Note that even in a case where light metering and pre-flash emission are respectively performed by the camera 10 and the flash 300 after the second signal SW2 has been turned ON in step S401, it is possible to establish synchronization between light metering performed by the camera 10 and pre-flash emission performed by the flash 300, in the same manner as in the case of exposure performed by the camera 10 and light emission performed by the flash 300.

Fifth Embodiment

The following describes a flash synchronization shooting system according to a fifth embodiment.

Figure 7A:
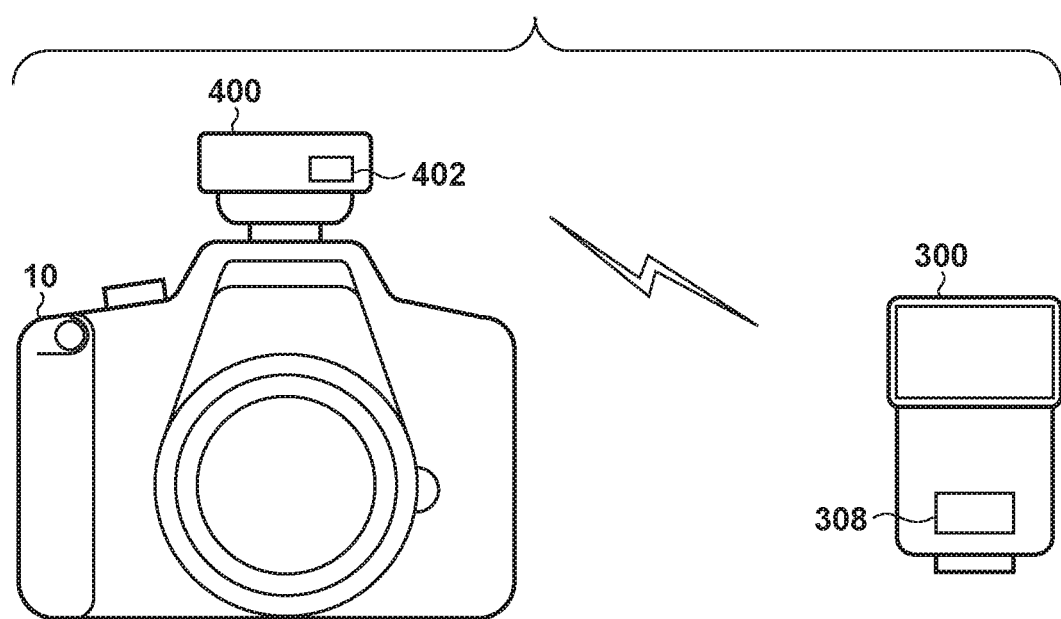
FIG. 7A is a diagram showing an example of a flash synchronization shooting system according to a fifth embodiment.

FIG. 7A is a diagram showing an example of a flash synchronization shooting system according to the fifth embodiment. The transmitter 400 is attached to the accessory shoe (not shown) of the camera body 100. The transmitter 400 includes a wireless communication unit 402. The configuration of the flash 300 is the same as that shown in FIG. 2B according to the first embodiment.

When the transmitter 400 and the flash 300 are set to a wireless communication mode, the transmitter 400 operates as a master and the flash 300 operates as a slave, and thus the wireless communication unit 402 and the flash-side wireless module 308 perform wireless communication. Note that a master flash (not shown) may be used instead of the transmitter 400 to perform wireless communication with the slave flash 300.

Figure 7B:
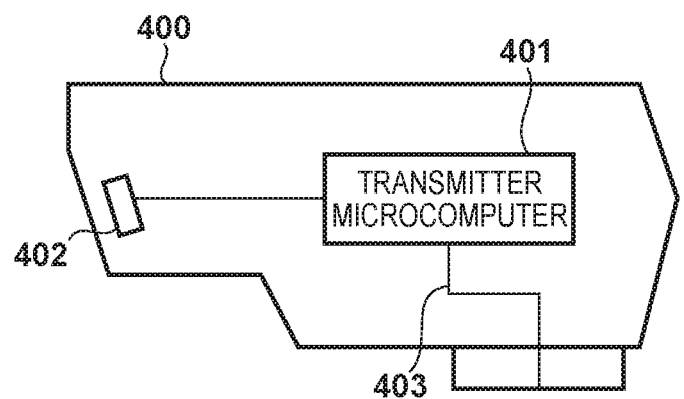
FIG. 7B is a diagram showing a configuration of a transmitter according to the fifth embodiment.

Next, the following describes the configuration and functions of the transmitter 400 with reference to FIG. 7B.

In the transmitter 400, a microcomputer (hereinafter referred to as a "transmitter microcomputer") 401 executes control programs such as firmware to control operations of each of the components included in the transmitter 400.

The transmitter microcomputer 401 includes, for example, a CPU, a ROM, a RAM, an input/output control circuit (an I/O control circuit), a multiplexer, a timer circuit, an EEPROM, an A/D converter, and a D/A converter, and is configured as a single IC chip with a built-in microcomputer.

The wireless communication unit 402 performs wireless communication with the flash 300. It is envisaged that the wireless communication unit 402 is a functional unit provided in the transmitter 400, or the like. In the present embodiment, the wireless communication unit 402 is a wireless module. The transmitter-side wireless module 402 is provided with an antenna for wireless communication, and realizes short-range wireless communication conforming to the IEEE 802.15 standard (Bluetooth (registered trademark)). The transmitter-side wireless module 402 performs wireless communication with the flash 300 at predetermined intervals, and notifies the transmitter microcomputer 401 of the timing at which the transmitter-side wireless module 402 received null data or non-null data.

The transmitter-side wireless module 402 also includes the transmitter-side interface 403, and transmits/receives data to/from the transmitter microcomputer 401 via the transmitter-side interface 403.

Upon the transmitter 400 being attached to the accessory shoe (not shown) of the camera body 100, the transmitter-side interface 403 is connected to the camera-side interface 112. As a result, the transmitter microcomputer 401 can communicate with the camera microcomputer 101.

Next, with reference to FIGS. 8A and 8B, the following describes an operation sequence of flash synchronization shooting in a case where the transmitter 400 attached to the camera body 100 and the flash 300 are used as shown in FIG. 7A.

Note that, in the fifth embodiment, the configurations of the camera 10 and the flash 300, and the operations of the camera body 100 performed until the second signal SW2 is turned ON are the same as those in the first embodiment.

The fifth embodiment is different from the first embodiment in that the camera 10 and the flash 300 perform wireless communication via the transmitter 400, and the transmitter-side wireless module 402 is used instead of the camera-side wireless module 111. In FIGS. 8A and 8B, communication performed using the transmitter 400 corresponds to processing performed in step S503 through which light emission information is transmitted, processing performed in step S509 through which a response is transmitted, and processing performed in step S519 through which t3 is transmitted. Processing performed in these steps are added to FIG. 3 according to the first embodiment. The fifth embodiment is otherwise the same as the first embodiment.

As described above, even in a case where the transmitter-side wireless module 402, which is an external apparatus, is used instead of the camera-side wireless module 111, it is possible to establish synchronization between exposure performed by the camera 10 and light emission performed by the flash 300.

Sixth Embodiment

The following describes a flash synchronization shooting system according to a sixth embodiment.

Figure 9:
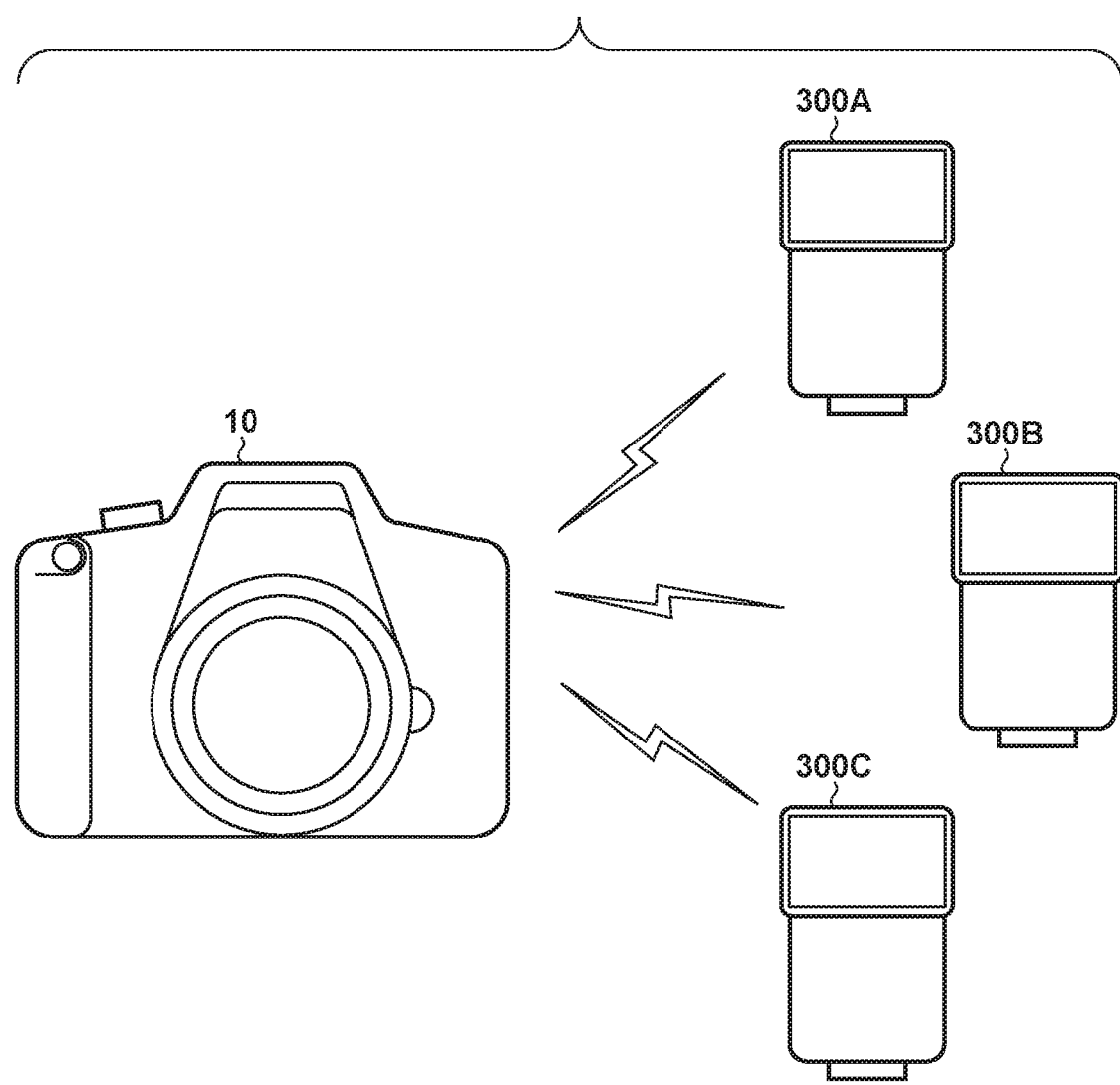
FIG. 9 is a diagram showing an example of a flash synchronization shooting system according to a sixth embodiment.

FIG. 9 is a diagram showing an example of a flash synchronization shooting system according to the sixth embodiment. When the camera 10 and flashes 300A to 300C are set to a wireless communication mode, wireless communication is performed between the camera 10, which operates as a master, and the flashes 300A to 300C, which operate as slaves.

Although FIG. 9 shows three flashes 300A to 300C as flashes that perform wireless communication with the camera 10, the number of flashes may be two or four or more.

In the sixth embodiment, the configurations of the camera 10 and the flashes 300A to 300C and the wireless communication scheme employed by the camera-side wireless module 111 and the flash-side wireless modules 308 are the same as those shown in FIGS. 2A and 2B according to the first embodiment. The operations of the camera body 100 performed until the second signal SW2 is turned ON are the same as those according to the first embodiment.

Figure 10A:
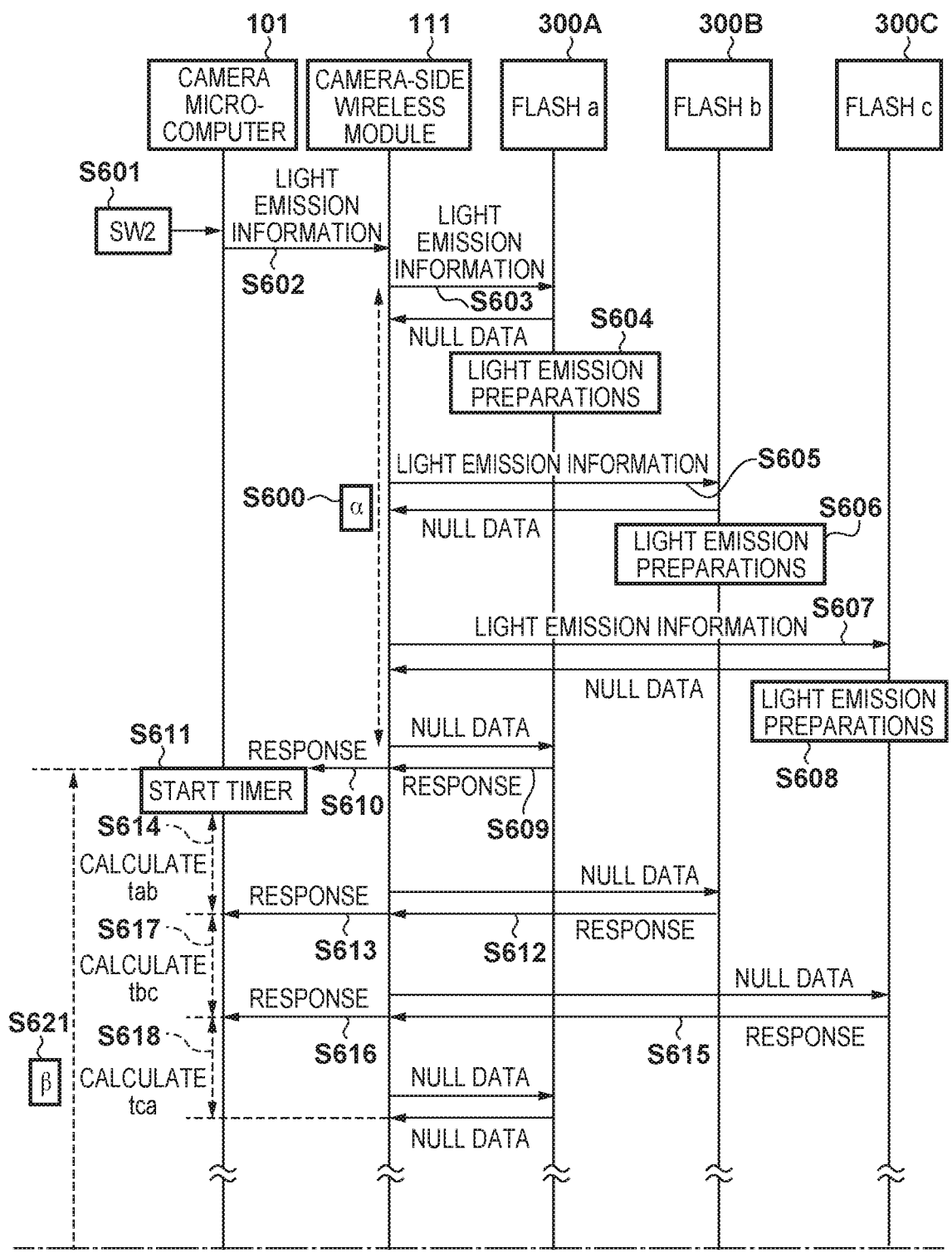
FIGS. 10A and 10B are sequence diagrams illustrating operations performed during flash synchronization shooting according to the sixth embodiment.
Figure 10B:
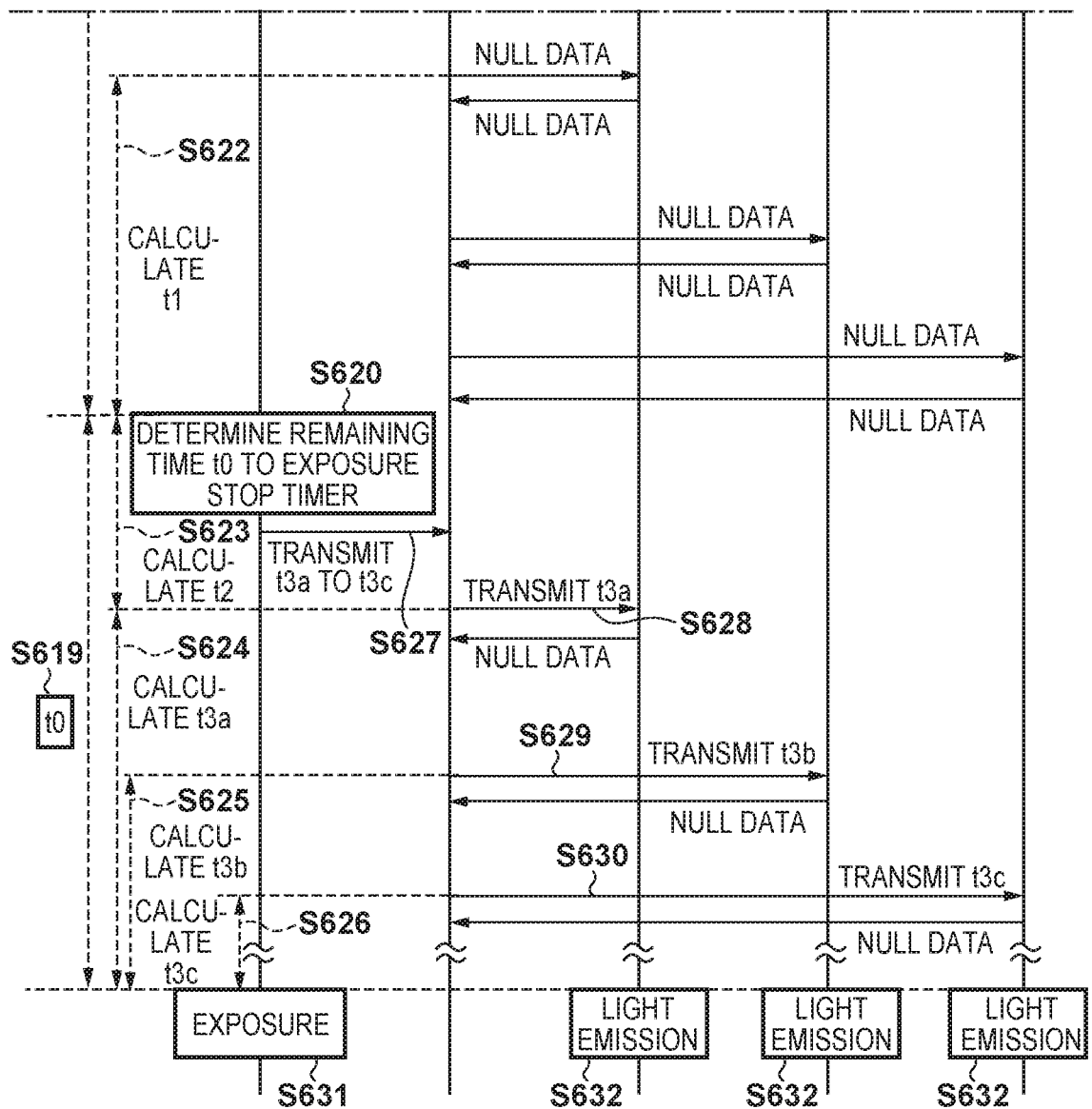

Next, with reference to FIGS. 10A and 10B, the following describes an operation sequence of flash synchronization shooting in a case where the camera 10 and the flashes 300A to 300C perform one-to-many communication as shown in FIG. 9.

In step S600, the camera-side wireless module 111 and each of the flash-side wireless modules 308 of the flashes 300A to 300C perform wireless communication at predetermined intervals (intervals α) asynchronously with the camera microcomputer 101 or the flash microcomputer 301. If there is no data to be transmitted, the camera-side wireless module 111 and the flash-side wireless modules 308 transmit/receive null data to/from each other. The camera-side wireless module 111 and the flash-side wireless modules 308 respectively notify the camera microcomputer 101 and the flash microcomputers 301 of the points in time at which the camera-side wireless module 111 and the flash-side wireless modules 308 received non-null data.

Upon the second signal SW2 being turned ON in step S601, the camera microcomputer 101 outputs, in step S602, light emission information, which contains, for example, information regarding the amount of light to be emitted and the light emission mode of the flash 300A, to the camera-side wireless module 111.

In step S603, upon the time to start wireless communication being reached, the camera-side wireless module 111 transmits light emission information to the flash-side wireless module 308 of the flash 300A.

In step S604, the flash-side wireless module 308 of the flash 300A outputs the light emission information received from the camera-side wireless module 111 to the flash microcomputer 301. Also, the flash microcomputer 301 outputs a response to the light emission information to the flash-side wireless module 308, and starts light emission preparation operations based on the light emission information.

In step S605, upon the time to start wireless communication being reached, the camera-side wireless module 111 transmits light emission information to the flash-side wireless module 308 of the flash 300B.

In step S606, the flash-side wireless module 308 of the flash 300B outputs the light emission information received from the camera-side wireless module 111 to the flash microcomputer 301. Also, the flash microcomputer 301 outputs a response to the light emission information to the flash-side wireless module 308, and starts light emission preparation operations based on the light emission information.

In step S607, upon the time to start wireless communication being reached, the camera-side wireless module 111 transmits light emission information to the flash-side wireless module 308 of the flash 300C.

In step S608, the flash-side wireless module 308 of the flash 300C outputs the light emission information received from the camera-side wireless module 111 to the flash microcomputer 301. Also, the flash microcomputer 301 outputs a response to the light emission information to the flash-side wireless module 308, and starts light emission preparation operations based on the light emission information.

In step S609, upon the time to start wireless communication being reached, the flash-side wireless module 308 of the flash 300A transmits a response to the camera-side wireless module 111.

In step S610, the camera-side wireless module 111 notifies the camera microcomputer 101 of the timing at which the camera-side wireless module 111 received the response from the flash-side wireless module 308.

In step S611, after receiving the response notification from the camera-side wireless module 111, the camera microcomputer 101 starts the timer of the camera microcomputer 101. The camera microcomputer 101 also performs control such as diaphragm driving control and mirror lifting up control. Processing for control such as diaphragm driving control and mirror lifting up control, which varies depending on shooting conditions, is performed.

In step S612, upon the time to start wireless communication being reached, the flash-side wireless module 308 of the flash 300B transmits a response to the camera-side wireless module 111.

In step S613, the camera-side wireless module 111 notifies the camera microcomputer 101 of the timing at which the camera-side wireless module 111 received the response from the flash-side wireless module 308.

In step S614, the camera microcomputer 101 acquires the value of the timer, and calculates an interval tab between communication with the flash 300A and communication with the flash 300B.

In step S615, upon the time to start wireless communication being reached, the flash-side wireless module 308 of the flash 300C transmits a response to the camera-side wireless module 111.

In step S616, the camera-side wireless module 111 notifies the camera microcomputer 101 of the timing at which the camera-side wireless module 111 received the response from the flash-side wireless module 308.

In step S617, the camera microcomputer 101 acquires the value of the timer, and calculates an interval tbc between communication with the flash 300B and communication with the flash 300C.

In step S618, the camera microcomputer 101 calculates an interval tca between communication with the flash 300C and communication with the flash 300A by subtracting the sum of tab and tbc from the predetermined communication interval α.

In step S619, the camera microcomputer 101 performs control such as diaphragm driving control and mirror lifting up control. Upon completion of processing for control such as diaphragm driving control and mirror lifting up control, which varies depending on shooting conditions, the remaining time to exposure is set to t0.

Upon the remaining time t0 to exposure being determined, the camera microcomputer 101 stops the timer in step S620, and acquires a timer value β in step S621.

In step S622, the camera microcomputer 101 divides the period of time β acquired in step S621 by the predetermined communication interval α, and the quotient thus obtained is the number of times wireless communication was performed during the period of time β, and the remainder is the period of time from when the last wireless communication with the flash 300A was performed to when the timer was stopped. If this remainder is expressed as t1, t1 is the period of time from when the wireless communication was performed immediately before t0 was determined in step S619, to when t0 was determined.

In the case where the camera microcomputer 101 performs wireless communication with the flash 300A first, in step S623, the camera microcomputer 101 subtracts t1, obtained in step S622, from the predetermined communication interval α, to obtain a period of time t2, which is a period of time from when t0 was determined to when the subsequent wireless communication is to be performed.

In step S624, the camera microcomputer 101 subtracts t2, obtained in step S623, from the remaining time t0 to exposure, determined in step S619, to obtain a period of time t3a remaining before the flash 300A emits light.

In step S625, after determining t3a, the camera microcomputer 101 subtracts tab, calculated in step S614, from t3a, to obtain a period of time t3b remaining before the flash 300B emits light. Similarly, in step S626, the camera microcomputer 101 subtracts tbc, calculated in step S617, from t3b, to obtain a period of time t3c remaining before the flash 300C emits light.

In step S627, the camera microcomputer 101 outputs information regarding the period of time t3a, t3b, and t3c calculated in steps S624 to S626, to the camera-side wireless module 111.

In step S628, upon the time to start wireless communication with the flash 300A being reached, the camera-side wireless module 111 transmits information regarding the period of time t3a to the flash 300A.

The flash microcomputer 301 of the flash 300A sets t3a, received from the flash-side wireless module 308, as the period of waiting time.

In step S629, upon the time to start wireless communication with the flash 300B being reached, the camera-side wireless module 111 transmits information regarding the period of time t3b to the flash 300B.

The flash microcomputer 301 of the flash 300B sets t3b, received from the flash-side wireless module 308, as the period of waiting time.

In step S630, upon the time to start wireless communication with the flash 300C being reached, the camera-side wireless module 111 transmits information regarding the period of time t3c to the flash 300C.

The flash microcomputer 301 of the flash 300C sets t3c, received from the flash-side wireless module 308, as the period of waiting time.

In step S631, the camera microcomputer 101 performs exposure upon the period of time t0, i.e. t2+t3a, elapsing after step S620 has been completed.

In step S632, upon the periods of waiting time t3a, t3b, and t3c set in steps S628 to S630 elapsing, the flash microcomputers 301 of the flashes 300A to 300C perform light emission based on information regarding the light emission preparations performed in steps S604, S606, and S608, respectively.

Thus, the camera 10 and the flashes 300A to 300C synchronize with one another.

Upon the shooting sequence being complete in this way, the camera 10 and the flashes 300A to 300C return to the shooting standby state in which the first signal SW1 is awaited.

Note that FIGS. 10A and 10B shows the case where the flash with which the camera 10 performs wireless communication first, after step S620 has been completed, is the flash 300A. The following describes the case where the flash that communicates with the camera 10 first is the flash 300B, and the case where that is the flash 300C, with reference to FIGS. 11 and 12, respectively.

The flash with which the camera 10 performs wireless communication first after step S620 has been completed is changed depending on the value of t1. The relationship between the value of t1 and the flash with which the camera 10 communicates first is as follows.

0<t1≤tab: the camera 10 communicates with the flash 300B first.

tab<t1≤tab+tbc: the camera 10 communicates with the flash 300 first.

tab+tbc<t1≤α: the camera 10 communicates with the flash 300A first.

Figure 11:
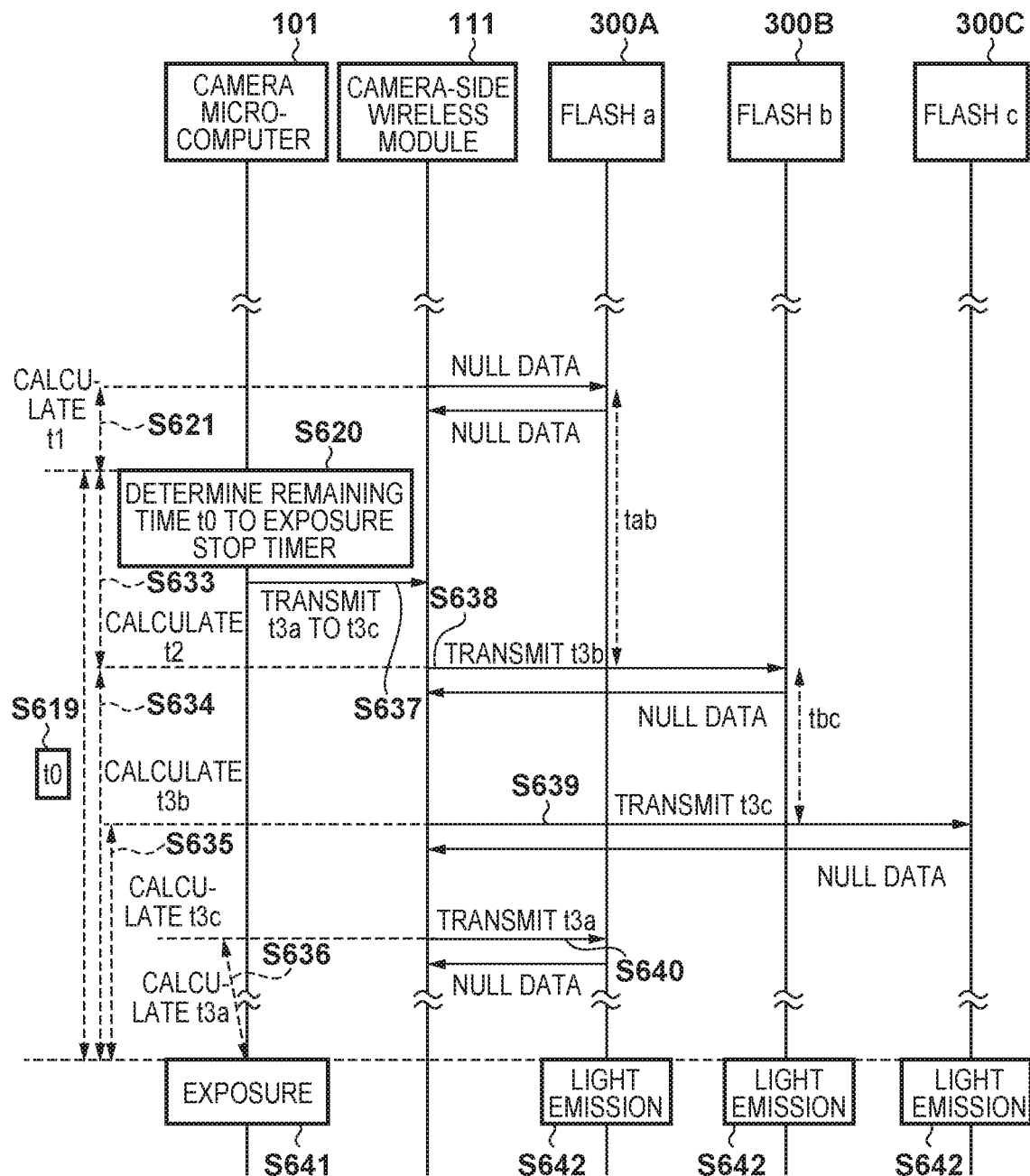
FIG. 11 is a sequence diagram illustrating operations performed during flash synchronization shooting according to the sixth embodiment.

With reference to FIG. 11, the following describes the case where the camera 10 communicates with the flash 300B first, after step S620 has been completed.

The steps up to step S621 in FIG. 11 are the same as those in FIGS. 10A and 10B.

The value of t1 calculated in step S621 after the timer has been stopped in step S620 satisfies 0<t1≤tab. Therefore, it is determined that the flash with which the camera 10 performs wireless communication first is the flash 300B. In step S633, the camera microcomputer 101 can obtain the period of time t2 from when the timer was stopped in step S620 to when the first wireless communication thereafter is to be performed, by subtracting t1 from tab.

In step S634, the camera microcomputer 101 subtracts t2, obtained in step S633, from t0, obtained in step S619, to obtain the period of time t3b remaining before the flash 300B emits light, which is to be transmitted to the flash 300B.

In step S635, the camera microcomputer 101 subtracts tbc from t3b to obtain the period of time t3c remaining before light emission, which is to be transmitted to the flash 300C. Similarly, in step S636, the camera microcomputer 101 subtracts tca from t3c to obtain the period of time t3a remaining before light emission, which is to be transmitted to the flash 300A.

In step S637, the camera microcomputer 101 transmits information regarding the period of time t3a to t3c, calculated in steps S634 to S636, to the camera-side wireless module 111.

In step S638, upon the time to start wireless communication with the flash 300B being reached, the camera-side wireless module 111 transmits information regarding the period of time t3b to the flash 300B.

The flash microcomputer 301 of the flash 300B sets t3b, received from the flash-side wireless module 308, as the period of waiting time.

In step S639, upon the time to start wireless communication with the flash 300C being reached, the camera-side wireless module 111 transmits information regarding the period of time t3c to the flash 300C.

The flash microcomputer 301 of the flash 300C sets t3c, received from the flash-side wireless module 308, as the period of waiting time.

In step S640, upon the time to start wireless communication with the flash 300A being reached, the camera-side wireless module 111 transmits information regarding the period of time t3a to the flash 300A.

The flash microcomputer 301 of the flash 300A sets t3a, received from the flash-side wireless module 308, as the period of waiting time.

In step S641, the camera microcomputer 101 performs exposure upon the period of time t0, i.e. t2+t3b, elapsing after step S619 has been completed.

In step S642, upon the periods of waiting time t3a, t3b, and t3c set in steps S637 to S639 elapsing, the flash microcomputers 301 of the flashes 300A to 300C perform light emission based on information regarding the light emission preparations performed in steps S604, S606, and S608, respectively.

Thus, the camera 10 and the flashes 300A to 300C synchronize with one another.

Upon the shooting sequence being complete in this way, the camera 10 and the flashes 300A to 300C return to the shooting standby state in which the first signal SW1 is awaited.

Figure 12:
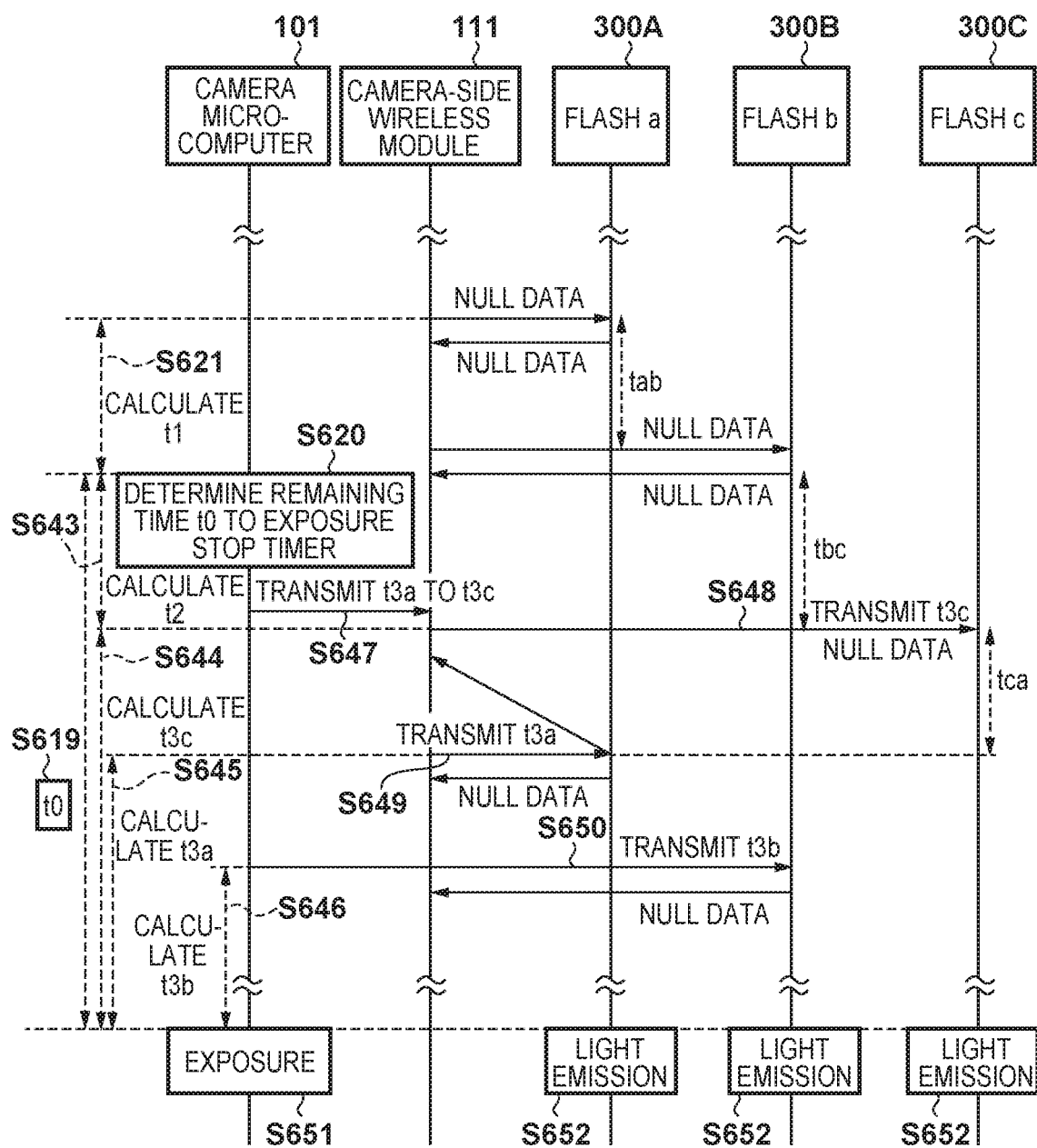
FIG. 12 is a sequence diagram illustrating operations performed during flash synchronization shooting according to the sixth embodiment.

Subsequently, with reference to FIG. 12, the following describes the case where the camera 10 communicates with the flash 300C first, after step S620 has been completed.

The value of t1 calculated in step S621 after the timer has been stopped in step S620 satisfies tab<t1≤tab+tbc. Therefore, it is determined that the flash with which the camera 10 performs wireless communication first is the flash 300C. In step S643, the camera microcomputer 101 can obtain the period of time t2 from when the timer was stopped in step S620 to when the first wireless communication thereafter is to be performed, by subtracting t1 from tab+tbc.

In step S644, the camera microcomputer 101 subtracts t2, obtained in step S643, from t0, obtained in step S619, to obtain the period of time t3c remaining before light emission, which is to be transmitted to the flash 300C.

In step S645, the camera microcomputer 101 subtracts tca from t3c to obtain the period of time t3a remaining before light emission, which is to be transmitted to the flash 300A. Similarly, in step S646, the camera microcomputer 101 subtracts tab from t3a to obtain the period of time t3b remaining before light emission, which is to be transmitted to the flash 300B.

In step S647, the camera microcomputer 101 transmits information regarding the period of time t3a to t3c, calculated in steps S644 to S646, to the camera-side wireless module 111.

In step S648, upon the time to start wireless communication with the flash 300C being reached, the camera-side wireless module 111 transmits information regarding the period of time t3c to the flash 300C.

The flash microcomputer 301 of the flash 300C sets t3c, received from the flash-side wireless module 308, as the period of waiting time.

In step S649, upon the time to start wireless communication with the flash 300A being reached, the camera-side wireless module 111 transmits information regarding the period of time t3a to the flash 300A.

The flash microcomputer 301 of the flash 300A sets t3a, received from the flash-side wireless module 308, as the period of waiting time.

In step S650, upon the time to start wireless communication with the flash 300B being reached, the camera-side wireless module 111 transmits information regarding the period of time t3b to the flash 300B.

The flash microcomputer 301 of the flash 300B sets t3b, received from the flash-side wireless module 308, as the period of waiting time.

In step S651, the camera microcomputer 101 performs exposure upon the period of time t0, i.e. t2+t3c, elapsing after step S619 has been completed.

In step S652, upon the periods of waiting time t3a, t3b, and t3c set in steps S647 to S649 elapsing, the flash microcomputers 301 of the flashes 300A to 300C perform light emission based on information regarding the light emission preparations performed in steps S604, S606, and S608, respectively.

Thus, the camera 10 and the flashes 300A to 300C synchronize with one another.

Upon the shooting sequence being complete in this way, the camera 10 and the flashes 300A to 300C return to the shooting standby state in which the first signal SW1 is awaited.

As described above, the camera microcomputer 101 acquires the points in time at which the camera microcomputer 101 received data from the camera-side wireless module 111, and calculates the intervals between communication with the plurality of flashes 300A to 300C (step S614, step S617, and step S618). As a result, the camera microcomputer 101 can find out the timing of performing wireless communication with each of the plurality of flashes 300A to 300C at the time the remaining time to exposure is t0. Therefore, it is possible to obtain the order in which communication with each of the plurality of flashes 300A to 300C is to be performed, and individually calculate information regarding the periods of time t3a to t3c remaining before the flashes 300A to 300C emit light (steps S624 to S626). As a result, even in a case where the camera 10 and the flashes 300A to 300C perform asynchronous wireless communication, it is possible to establish synchronization between the timing of exposure performed by the camera 10 and the timing of light emission performed by each of the flashes 300A to 300C.

Note that even in a case where light metering and pre-flash emission for light amount adjustment are respectively performed by the camera 10 and the flashes 300A to 300C after the second signal SW2 has been turned ON in step S601, it is possible to establish synchronization between light metering performed by the camera 10 and pre-flash emission performed by the flashes 300A to 300C, in the same manner as in the case of exposure performed by the camera 10 and light emission performed by the flashes 300A to 300C.

Seventh Embodiment

The following describes a flash synchronization shooting system according to a seventh embodiment.

Figure 13A:
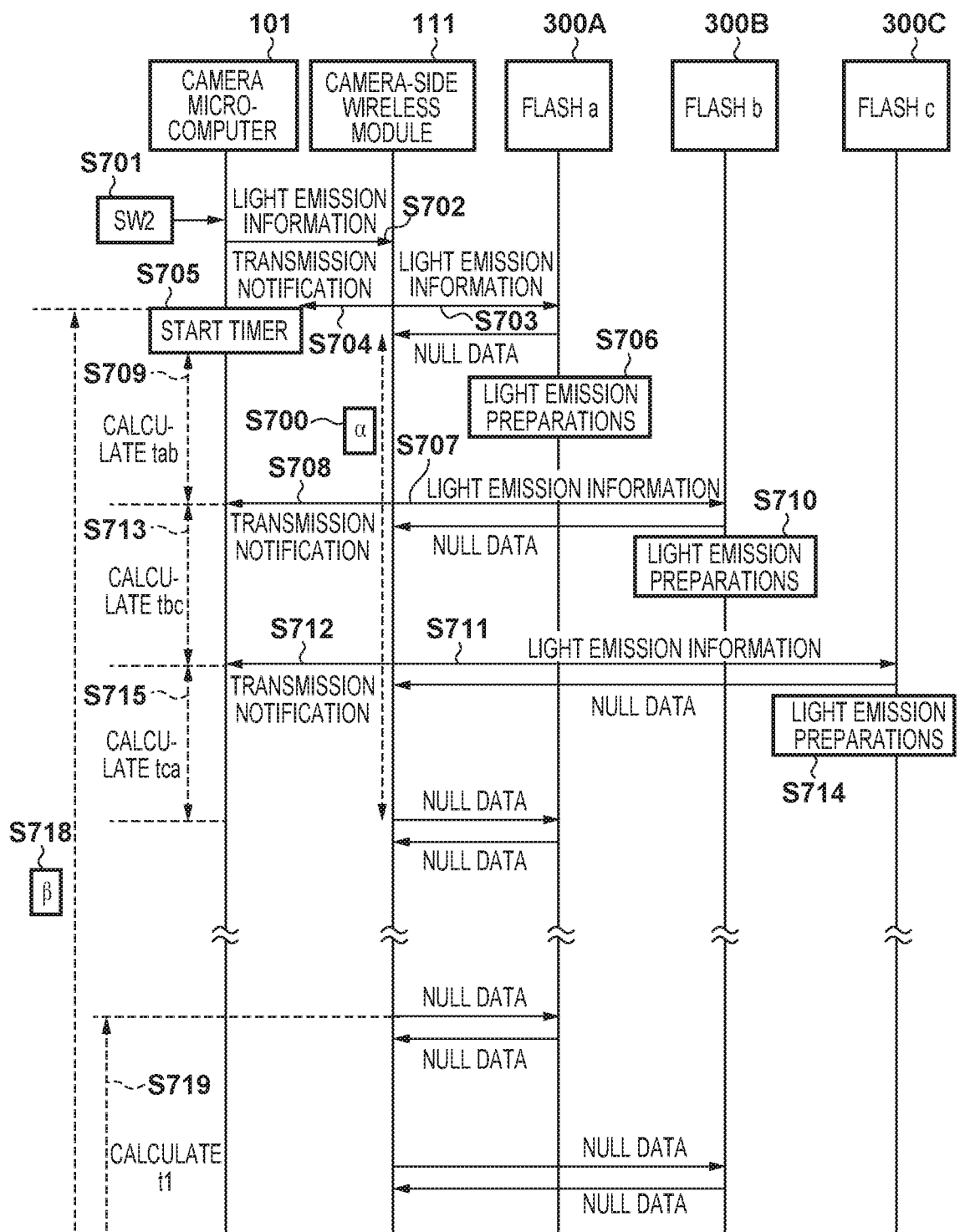
FIGS. 13A and 13B are sequence diagrams illustrating operations performed during flash synchronization shooting according to a seventh embodiment.
Figure 13B:
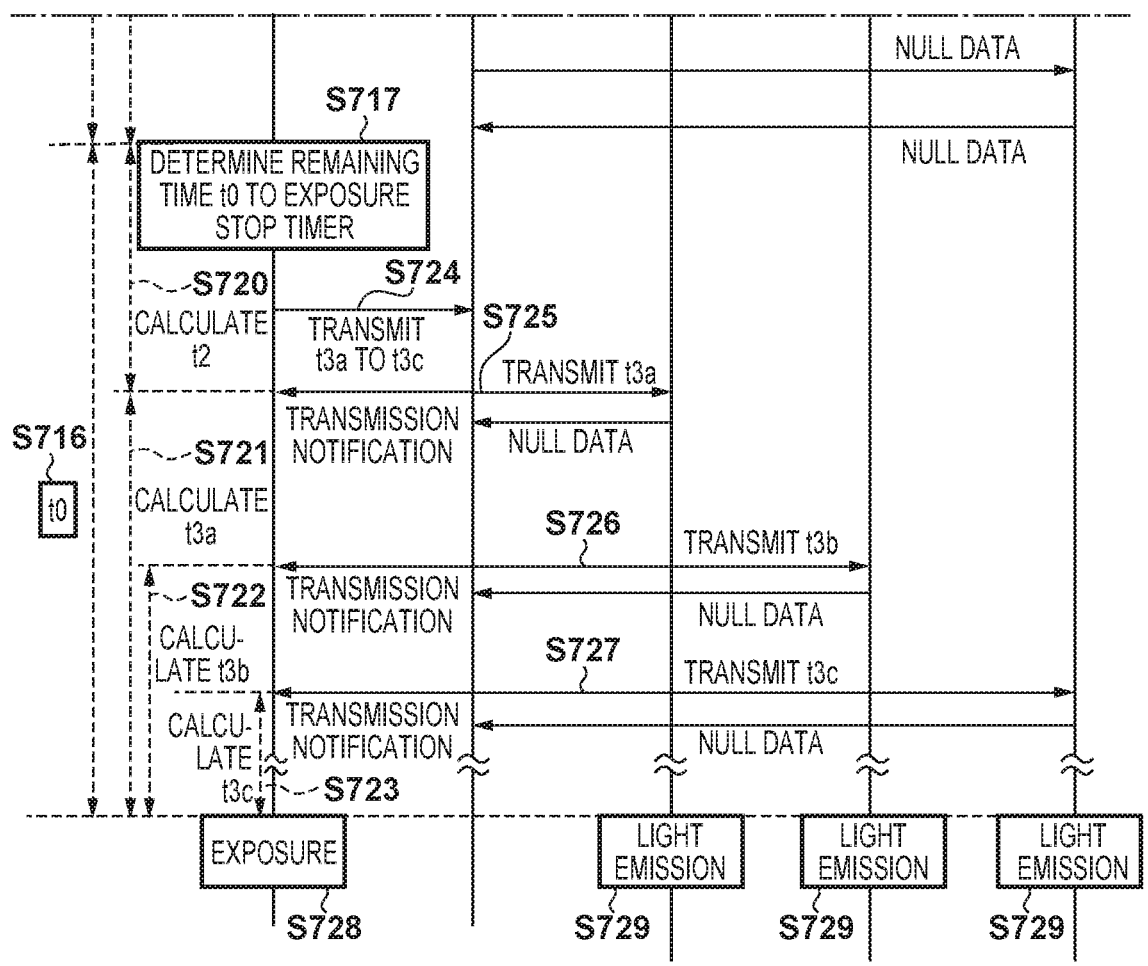

FIGS. 13A and 13B are diagrams illustrating an operation sequence of flash synchronization shooting in a case where the camera 10 and the flashes 300A to 300C perform one-to-many communication as shown in FIG. 9.

The camera-side wireless module 111 according to the seventh embodiment notifies the camera microcomputer 101 of the points in time at which the camera-side wireless module 111 transmitted non-null data. Similarly, the flash-side wireless modules 308 of the flashes 300A to 300C notify the flash microcomputers 301 of the points in time at which the flash-side wireless modules 308 received the non-null data, respectively.

Note that the configurations of the camera 10 and the flashes 300A to 300C are the same as the configurations of those shown in FIGS. 2A and 2B according to the first embodiment. Also, the wireless communication scheme employed by the camera-side wireless module 111 and the flash-side wireless modules 308, and the operations of the camera body 100 performed until the second signal SW2 is turned ON are the same as those according to the first embodiment.

Although three flashes are used in the present embodiment, the number of flashes may be two or four or more.

Upon the second signal SW2 being turned ON in step S701, the camera microcomputer 101 outputs, in step S702, light emission information, which contains, for example, information regarding the amount of light to be emitted and the light emission mode of the flash 300A, to the camera-side wireless module 111.

In step S703, upon the time to start wireless communication being reached, the camera-side wireless module 111 transmits light emission information to the flash-side wireless module 308 of the flash 300A, and in step S704, the camera-side wireless module 111 outputs a transmission notification to the camera microcomputer 101.

In step S705, after receiving the transmission notification from the camera-side wireless module 111, the camera microcomputer 101 starts the timer of the camera microcomputer 101.

The flash-side wireless module 308 of the flash 300A outputs the light emission information received from the camera-side wireless module 111 to the flash microcomputer 301.

In step S706, the flash microcomputer 301 starts light emission preparation operations based on the light emission information.

In step S707, upon the time to start wireless communication being reached, the camera-side wireless module 111 transmits light emission information to the flash-side wireless module 308 of the flash 300B, and in step S708, the camera-side wireless module 111 transmits a transmission notification to the camera microcomputer 101.

In step S709, after receiving the transmission notification from the camera-side wireless module 111, the camera microcomputer 101 acquires the timer value, and obtains the interval tab between communication with the flash 300A and communication with the flash 300B.

The flash-side wireless module 308 of the flash 300B outputs the light emission information received from the camera-side wireless module 111 to the flash microcomputer 301.

In step S710, the flash microcomputer 301 starts light emission preparation operations based on the light emission information.

In step S711, upon the time to start wireless communication being reached, the camera-side wireless module 111 transmits light emission information to the flash-side wireless module 308 of the flash 300C, and in step S712, the camera-side wireless module 111 transmits a transmission notification to the camera microcomputer 101.

In step S713, after receiving the transmission notification from the camera-side wireless module 111, the camera microcomputer 101 acquires the timer value, and obtains the interval tbc between communication with the flash 300B and communication with the flash 300C.

The flash-side wireless module 308 of the flash 300C outputs the light emission information received from the camera-side wireless module 111 to the flash microcomputer 301.

In step S714, the flash microcomputer 301 starts light emission preparation operations based on the light emission information.

In step S715, the camera microcomputer 101 calculates the interval tca between communication with the flash 300C and communication with the flash 300A by subtracting the sum of tab and tbc from the predetermined communication interval α.

Steps S716 to S729 are the same as steps S619 to S632 in FIGS. 10A and 10B according to the sixth embodiment, and therefore descriptions thereof are omitted. The method for determining the order in which communication with each of the flashes 300A to 300C is to be performed after the timer is stopped in step S717 is also the same as that shown in FIGS. 11 and 12 according to the sixth embodiment. Therefore, a description thereof is omitted.

As described above, the camera microcomputer 101 acquires the points in time at which the camera microcomputer 101 received data from the camera-side wireless module 111, and calculates the intervals between communication with the plurality of flashes 300A to 300C (step S709, step S713, and step S715). As a result, the camera microcomputer 101 can find out the timing of performing wireless communication with each of the plurality of flashes 300A to 300C at the time the remaining time to exposure is t0. Therefore, it is possible to obtain the order in which communication with each of the plurality of flashes 300A to 300C is to be performed, and individually calculate information regarding the periods of time t3a to t3c remaining before the flashes 300A to 300C emit light (steps S721 to S723). As a result, even when the camera 10 and the flashes 300A to 300C perform asynchronous wireless communication, it is possible to establish synchronization between the timing of exposure performed by the camera 10 and the timing of light emission performed by each of the flashes 300A to 300C.

Note that even in a case where light metering and pre-flash emission for light amount adjustment are respectively performed by the camera 10 and the flashes 300A to 300C after the second signal SW2 has been turned ON in step S601, it is possible to establish synchronization between light metering performed by the camera 10 and pre-flash emission performed by the flashes 300A to 300C, in the same manner as in the case of exposure performed by the camera 10 and light emission performed by the flashes 300A to 300C.

Eighth Embodiment

The following describes a flash synchronization shooting system according to an eighth embodiment.

Figure 14A:
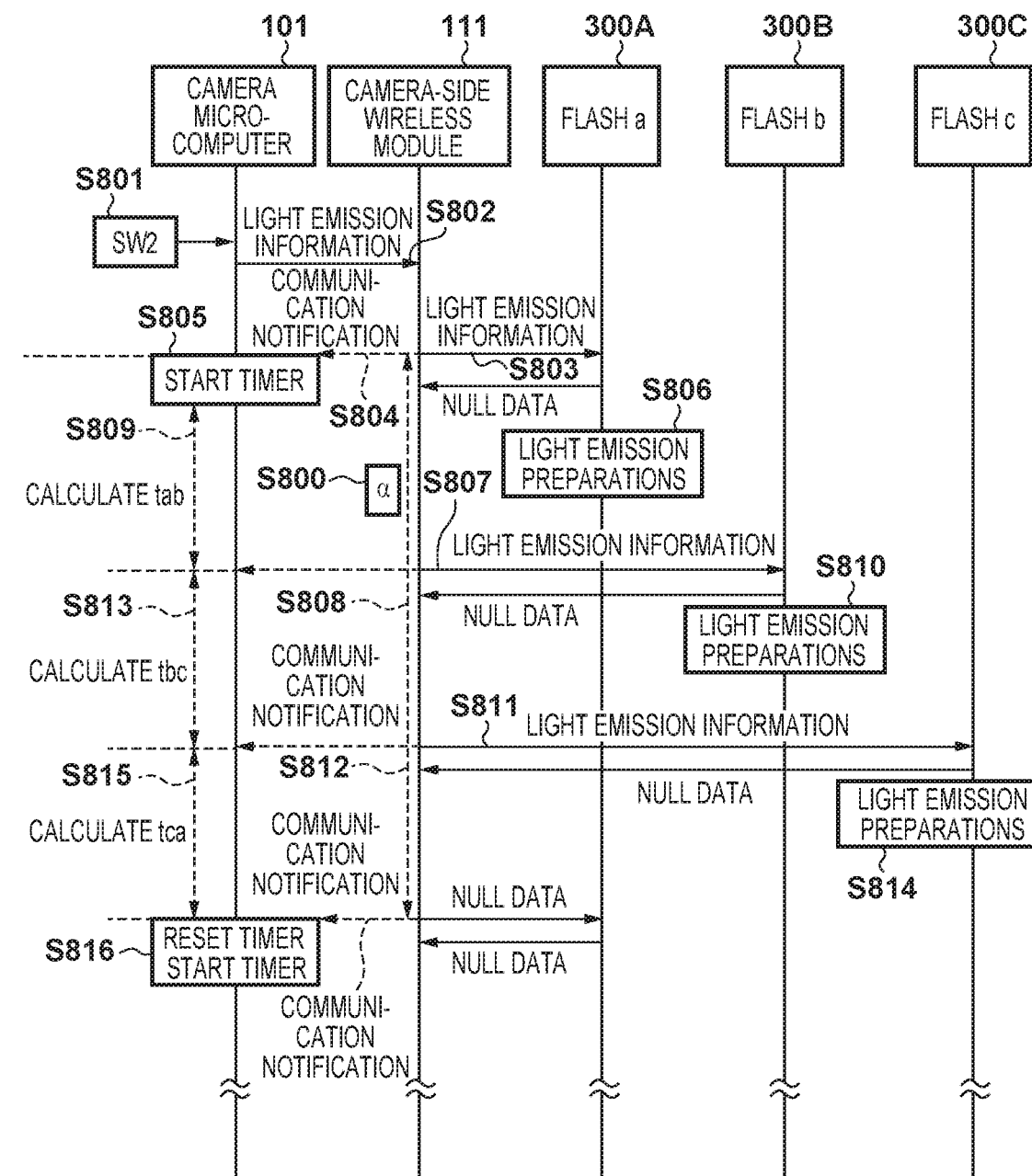
FIGS. 14A and 14B are sequence diagrams illustrating operations performed during flash synchronization shooting according to an eighth embodiment.
Figure 14B:
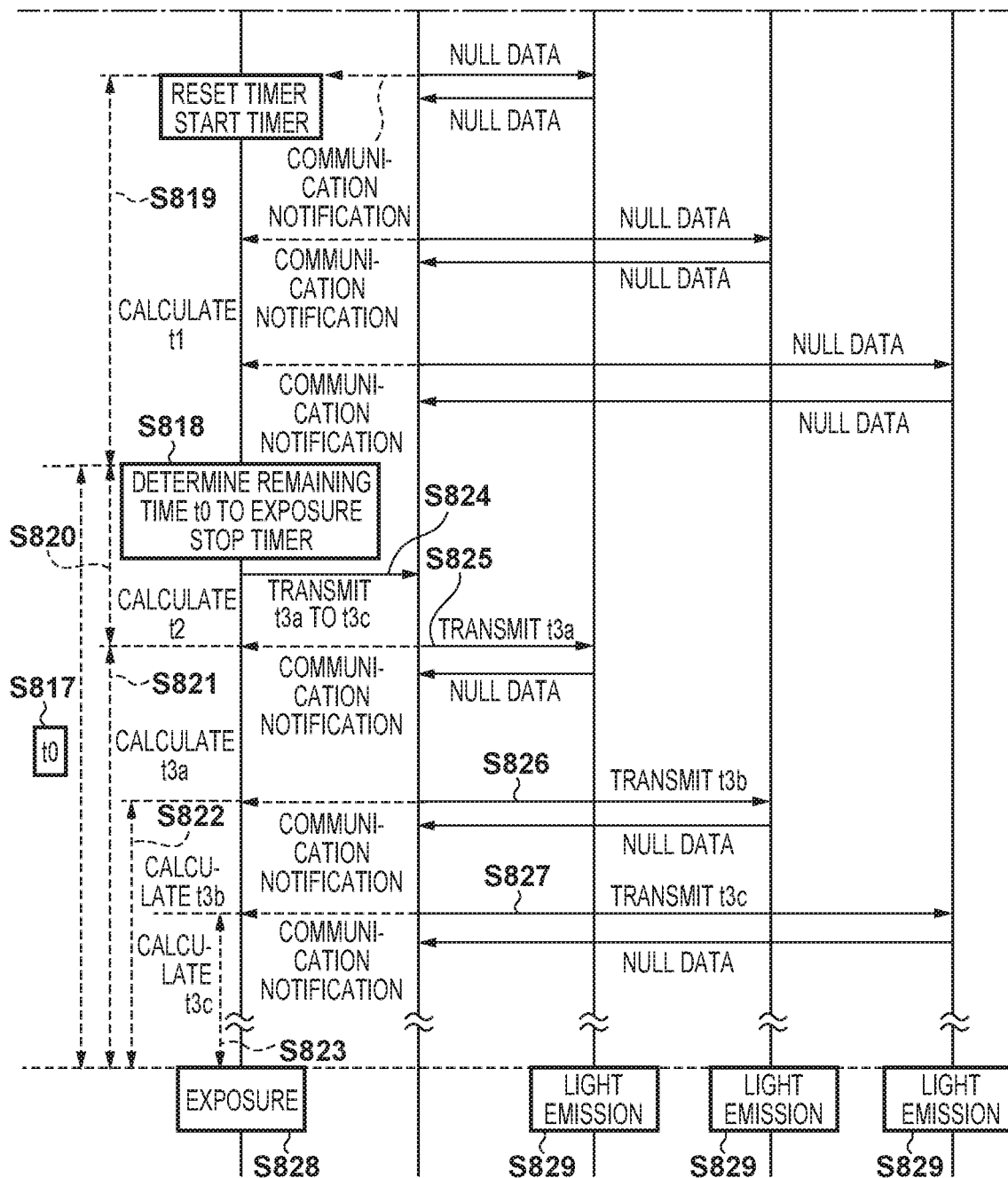

FIGS. 14A and 14B are diagrams illustrating an operation sequence of flash synchronization shooting in a case where the camera 10 and the flashes 300A to 300C perform one-to-many communication as shown in FIG. 9.

The camera-side wireless module 111 according to the eighth embodiment notifies the camera microcomputer 101 of the points in time at which the camera-side wireless module 111 transmitted data, which may be null data. Similarly, the flash-side wireless modules 308 of the flashes 300A to 300C notify the flash microcomputers 301 of the points in time at which the flash-side wireless modules 308 received data, which may be null data, respectively.

Note that the configurations of the camera 10 and the flashes 300A to 300C are the same as the configurations of those shown in FIGS. 2A and 2B according to the first embodiment. Also, the wireless communication scheme employed by the camera-side wireless module 111 and the flash-side wireless modules 308, and the operations of the camera body 100 performed until the second signal SW2 is turned ON (step S800) are the same as those according to the first embodiment.

Although three flashes are used in the present embodiment, the number of flashes may be two or four or more.

Steps S801 to S815 are the same as steps S701 to S715 in FIGS. 13A and 13B according to the seventh embodiment, and therefore descriptions thereof are omitted.

In step S816, the camera microcomputer 101 resets and starts the timer every time the camera microcomputer 101 receives a communication notification from the flash 300A.

In step S817, the camera microcomputer 101 performs control such as diaphragm driving control and mirror lifting up control. Upon completion of processing for control such as diaphragm driving control and mirror lifting up control, which varies depending on shooting conditions, the remaining time to exposure is set to t0.

Upon the remaining time t0 to exposure being determined, the camera microcomputer 101 stops the timer in step S818, and acquires the timer value. Then, in step S819, the camera microcomputer 101 sets the timer value to t1, which is the period of time from when the wireless communication was performed immediately before the remaining time t0 to exposure was determined, to when the remaining time t0 to exposure was determined.

Steps S820 to S829 are the same as steps S623 to S632 in FIGS. 10A and 10B according to the sixth embodiment. Also, the method for determining the order in which communication with each of the flashes 300A to 300C is to be performed after the timer is stopped in step S818 is also the same as that shown in FIGS. 11 and 12 according to the sixth embodiment.

As described above, the camera microcomputer 101 acquires the points in time at which the camera microcomputer 101 performed communication, from the camera-side wireless module 111, and calculates the intervals between communication with the plurality of flashes 300A to 300C (step S809, step S813, and step S815). As a result, the camera microcomputer 101 can find out the timing of performing wireless communication with each of the plurality of flashes 300A to 300C at the time the remaining time to exposure is t0. Therefore, it is possible to obtain the order in which communication with each of the plurality of flashes 300A to 300C is to be performed, and individually calculate the periods of time remaining before the flashes emit light (steps S821 to S823). As a result, even when the camera 10 and the flashes 300A to 300C perform asynchronous wireless communication, it is possible to establish synchronization between the timing of exposure performed by the camera 10 and the timing of light emission performed by each of the flashes 300A to 300C.

Note that even in a case where light metering and pre-flash emission for light amount adjustment are respectively performed by the camera 10 and the flashes 300A to 300C after the second signal SW2 has been turned ON in step S801, it is possible to establish synchronization between light metering performed by the camera 10 and pre-flash emission performed by the flashes 300A to 300C, in the same manner as in the case of exposure performed by the camera 10 and light emission performed by the flashes 300A to 300C.

Ninth Embodiment

The following describes a flash synchronization shooting system according to a ninth embodiment.

Figure 15A:
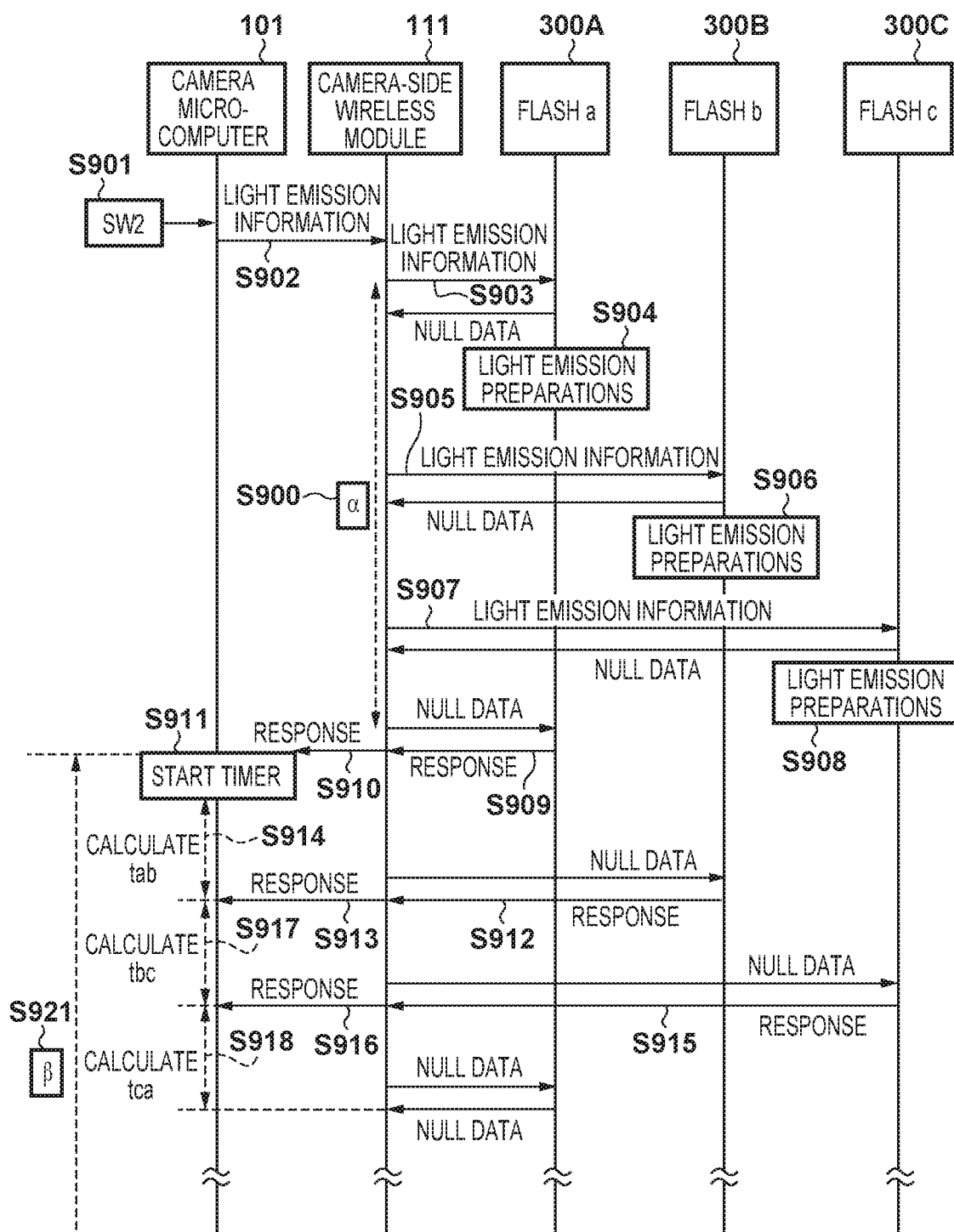
FIGS. 15A and 15B are sequence diagrams illustrating operations performed during flash synchronization shooting according to a ninth embodiment.
Figure 15B:
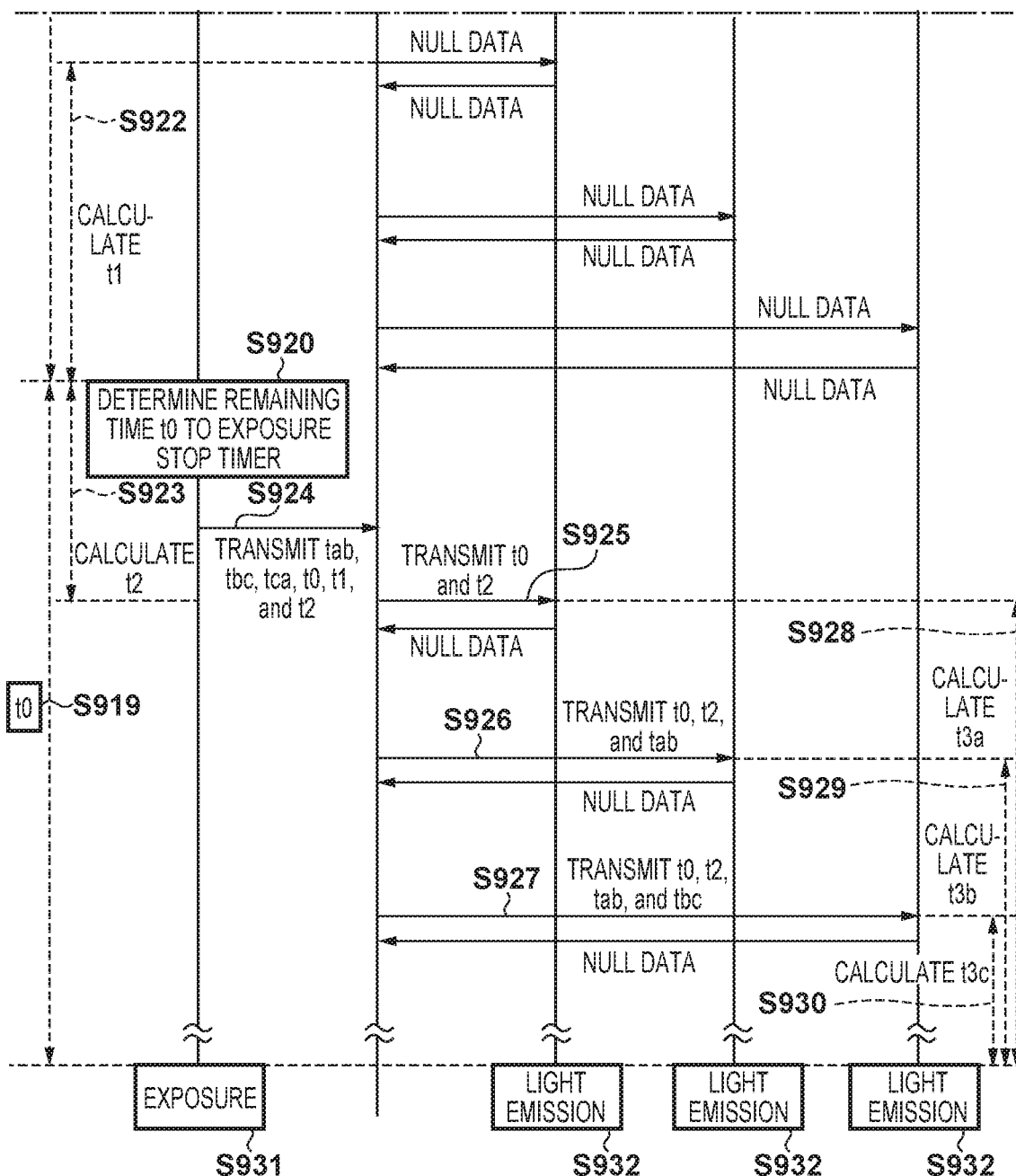

FIGS. 15A and 15B are diagrams illustrating an operation sequence of flash synchronization shooting in a case where the camera 10 and the flashes 300A to 300C perform one-to-many communication as shown in FIG. 9.

In the present embodiment, the camera 10 transmits, to the flashes 300A to 300C, information that is required to calculate the periods of time remaining before the flashes 300A to 300C emit light, and the flashes 300A to 300C calculate the periods of time t3a to t3c, which are periods of time from when the flashes 300A to 300C perform wireless communication to when the flashes 300A to 300C emit light, respectively.

Note that, in the ninth embodiment, the configurations of the camera 10 and the flashes 300A to 300C, the wireless communication scheme employed by the camera-side wireless module 111 and the flash-side wireless modules 308, and the operations of the camera body 100 performed until the second signal SW2 is turned ON are the same as those in the sixth embodiment.

Although three flashes are used in the present embodiment, the number of flashes may be two or four or more.

Steps S901 to S923 are the same as steps S601 to S623 in FIGS. 10A and 10B according to the sixth embodiment, and therefore descriptions thereof are omitted.

In step S924, the camera microcomputer 101 collects pieces of necessary data for each of the flashes 300A to 300C according to the value of t1 so that the flashes 300A to 300C can calculate the period of time remaining before light emission, and outputs such data to the camera-side wireless module 111. In FIGS. 15A and 15B, tab+tbc<t1≤α is satisfied. Therefore, t0 and t2 are to be transmitted to the flash 300A. How the flash with which the camera 10 performs wireless communication first is changed depending on the value of t1 is as described with reference to FIGS. 11 and 12 according to the sixth embodiment.

In step S925, upon the time to start wireless communication with the flash 300A being reached, the camera-side wireless module 111 transmits the data received in step S924 to the flash 300A via the flash-side wireless module 308.

The flash 300A calculates the period of time t3a remaining before the flash 300A emits light, based on t0 and t2 received in step S925, and sets t3a as the period of waiting time. It is possible to obtain t3a by subtracting t2 from t0.

In step S926, upon the time to start wireless communication with the flash 300B being reached, the camera-side wireless module 111 transmits the data received in step S924 to the flash 300B via the flash-side wireless module 308.

The flash 300B calculates the period of time t3b remaining before the flash 300B emits light, based on t0, t2, and tab received in step S926, and sets t3b as the period of waiting time. It is possible to obtain t3b by subtracting the sum of t2 and tab from t0.

In step S927, upon the time to start wireless communication with the flash 300C being reached, the camera-side wireless module 111 transmits the data received in step S924 to the flash 300C via the flash-side wireless module 308.

The flash 300C calculates the period of time t3c remaining before the flash 300C emits light, based on t0, t2, tab, and tbc received in step S927, and sets t3c as the period of waiting time. It is possible to obtain t3c by subtracting the sum of t2, tab, and tbc from t0.

The method for calculating the periods of time t3a to t3c remaining before the flashes 300A to 300C emit light, in the communication order, after the timer has been stopped in step S920, is as described with reference to FIGS. 11 and 12 according to the sixth embodiment.

In step S931, the camera microcomputer 101 performs exposure upon the period of time t0 elapsing after step S920 has been completed.

In step S932, upon the periods of waiting time t3a, t3b, and t3c set in steps S925 to S927 elapsing, the flash microcomputers 301 of the flashes 300A to 300C perform light emission based on information regarding the light emission preparations performed in steps S904, S906, and S908, respectively.

Thus, the camera 10 and the flashes 300A to 300C synchronize with one another.

Upon the shooting sequence being complete in this way, the camera 10 and the flashes 300A to 300C return to the shooting standby state in which the first signal SW1 is awaited.

As described above, the camera microcomputer 101 transmits, to the flashes 300A to 300C, information that is required to calculate the periods of time remaining before the flashes 300A to 300C emit light, and thus the flashes 300A to 300C can decide information regarding the periods of time t3a to t3c, which are periods of time from when wireless communication is performed to when the flashes 300A to 300C emit light, respectively. As a result, even when the camera 10 and the flashes 300A to 300C perform asynchronous wireless communication, it is possible to establish synchronization between the timing of exposure performed by the camera 10 and the timing of light emission performed by each of the flashes 300A to 300C.

Note that even in a case where light metering and pre-flash emission for light amount adjustment are respectively performed by the camera 10 and the flashes 300A to 300C after the second signal SW2 has been turned ON in step S901, it is possible to establish synchronization between light metering performed by the camera 10 and pre-flash emission performed by the flashes 300A to 300C, in the same manner as in the case of exposure performed by the camera 10 and light emission performed by the flashes 300A to 300C.

Tenth Embodiment

The following describes a flash synchronization shooting system according to a tenth embodiment.

Figure 16A:
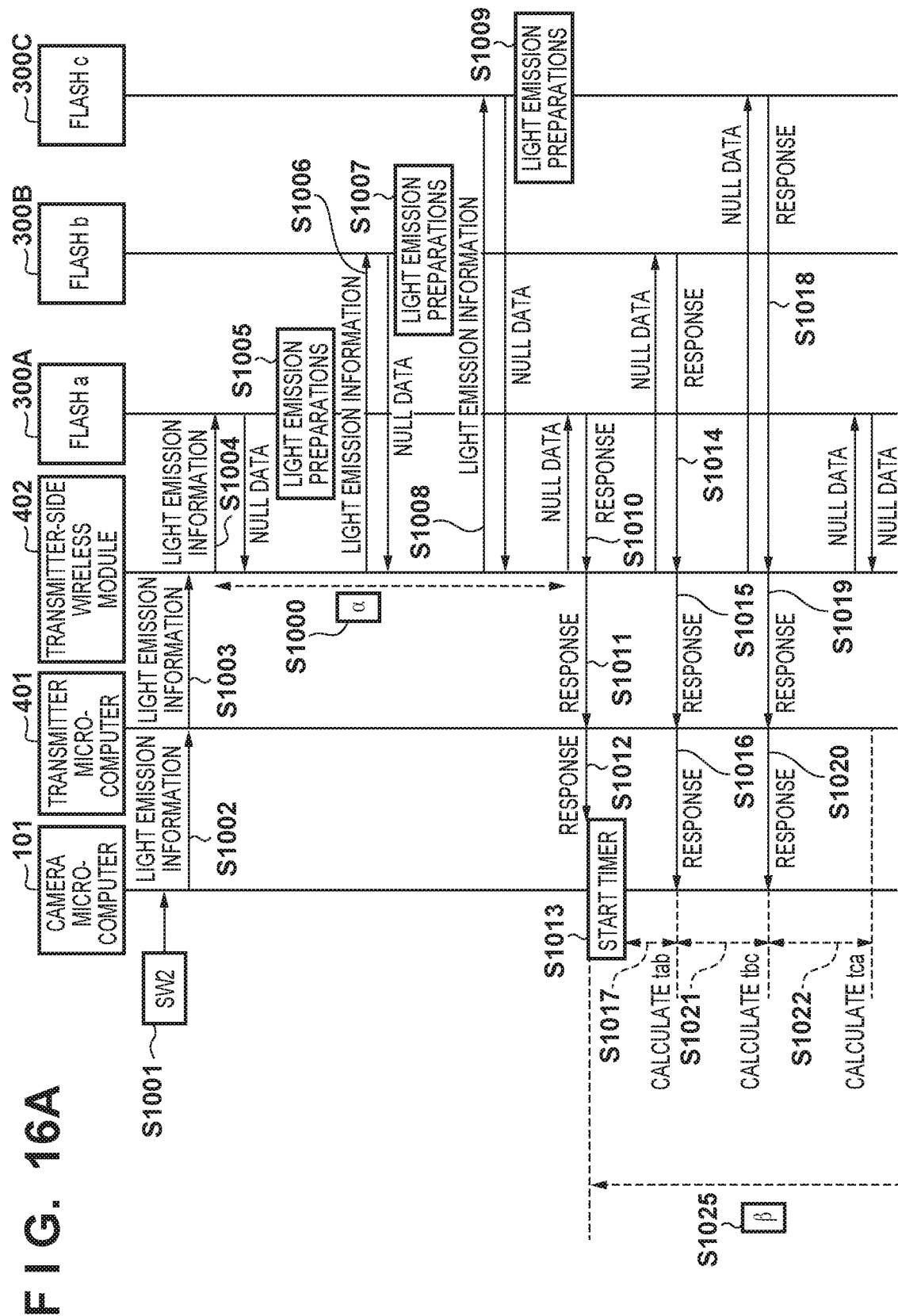
FIGS. 16A and 16B are sequence diagrams illustrating operations performed during flash synchronization shooting according to a tenth embodiment.
Figure 16B:
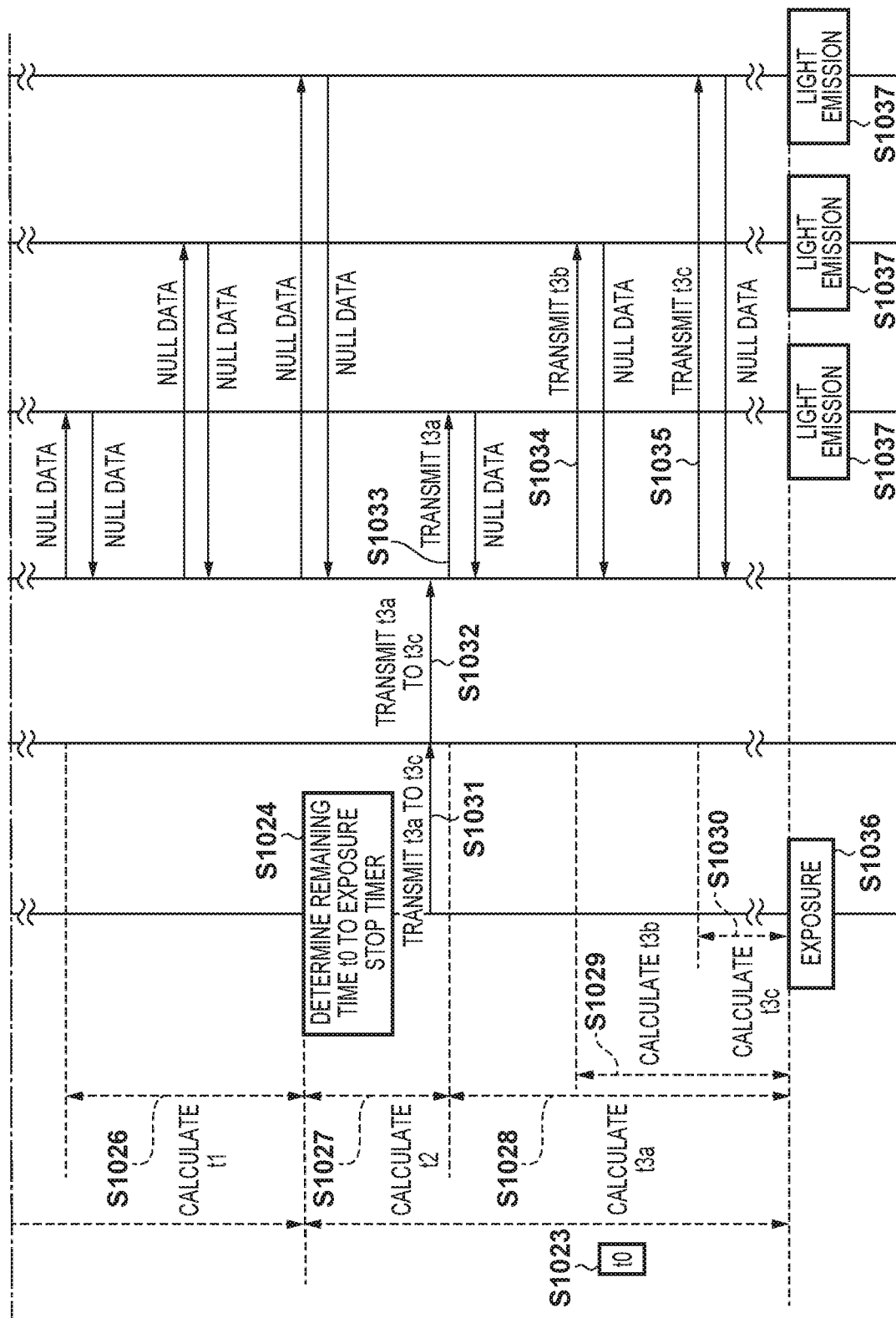

FIGS. 16A and 16B are diagrams illustrating an operation sequence of flash synchronization shooting in a case where the transmitter 400 attached to the camera body 100 and the plurality of flashes 300A to 300C are used as shown in FIG. 9.

Note that, in the tenth embodiment, the configurations of the camera 10 and the flashes 300A to 300C, the wireless communication scheme employed by the camera-side wireless module 111 and the flash-side wireless modules 308, and the operations of the camera body 100 performed until the second signal SW2 is turned ON are the same as those in the sixth embodiment. Also, the configuration of the transmitter 400 is the same as that in the fifth embodiment.

Although three flashes are used in the present embodiment, the number of flashes may be two or four or more.

The tenth embodiment is different from the sixth embodiment in that the camera 10 and the flashes 300A to 300C perform wireless communication via the transmitter 400, and the transmitter-side wireless module 402 is used instead of the camera-side wireless module 111. In FIGS. 16A and 16B, communication performed using the transmitter 400 corresponds to processing performed in step S1003 through which light emission information is transmitted, processing performed in steps S1011, S1015, and S1019 through which a response is transmitted, and processing performed in step S1032 through which t3a to t3c are transmitted. Processing performed in these steps are added to FIGS. 10A and 10B according to the sixth embodiment. The tenth embodiment is otherwise the same as the sixth embodiment.

As described above, even in a case where the transmitter-side wireless module 402, which is an external apparatus, is used instead of the camera-side wireless module 111, it is possible to establish synchronization between exposure performed by the camera 10 and light emission performed by the flashes 300A to 300C.

Eleventh Embodiment

The following describes a flash synchronization shooting system according to an eleventh embodiment.

FIG. 17 is a diagram illustrating an operation sequence of retry processing that is performed to re-transmit information at the time of flash synchronization shooting in a case where the camera 10 and the flash 300 perform one-to-one communication as shown in FIG. 1.

FIG. 17 illustrates an example in which, when transmission and reception of time information t3 from the camera-side wireless module 111 to the flash-side wireless module 308 have failed in step S117 in FIG. 3, retry processing is performed to extend the remaining time t0 to exposure and re-transmit the information.

Note that, in the present embodiment, as in the above-described embodiments, the camera 10 and the flash 300 perform wireless communication at predetermined intervals (intervals α) (step S1100). Also, after transmitting the time information t3 to the flash 300, the camera-side wireless module 111 notifies the camera microcomputer 101 of the point in time at which the camera-side wireless module 111 received a response (hereinafter referred to as a response packet (ACK)) from the flash 300. Similarly, the flash-side wireless module 308 notifies the flash microcomputer 301 of the point in time at which the flash-side wireless module 308 received the time information t3 from the camera 10.

Note that the configurations of the camera 10 and the flash 300 are the same as the configurations of those shown in FIGS. 2A and 2B according to the first embodiment. Also, the wireless communication scheme employed by the camera-side wireless module 111 and the flash-side wireless module 308, and operations of the camera body 100 that are performed until the second signal SW2 is turned ON are the same as those according to the first embodiment. Also, processing steps (steps S1102 and S1103) that are performed in the camera body 100 from when the second signal SW2 is turned ON (step S1101) to when the remaining time t0 to exposure is determined are the same as those in the first embodiment.

In step S1104, the camera microcomputer 101 outputs the time information t3 calculated in step S115 in FIG. 3, to the camera-side wireless module 111.

In step S1105, upon the time to start wireless communication being reached, the camera-side wireless module 111 transmits the time information t3 to the flash-side wireless module 308. In the present embodiment, it is assumed that the camera-side wireless module 111 has failed to transmit t3 to the flash-side wireless module 308. If the camera-side wireless module 111 does not receive a response packet from the flash-side wireless module 308 within a predetermined period of time, the camera-side wireless module 111 determines that the transmission of t3 has failed, and outputs a failure notification to the camera microcomputer 101 in step S1106.

In step S1107, upon receiving the failure notification, the camera microcomputer 101 performs processing to extend the remaining time t0 to exposure, to extend the remaining time t0 to exposure to t0+α as shown in step S1108, in order to perform retry processing.

In step S1109, upon the time to start the subsequent wireless communication being reached, the camera-side wireless module 111 re-transmits the time information t3 to the flash-side wireless module 308.

In step S1110, the flash-side wireless module 308 outputs the time information t3 received from the camera-side wireless module 111, to the flash microcomputer 301 as light emission information.

In step S1111, the flash-side wireless module 308 transmits a response packet indicating that the flash-side wireless module 308 has received non-null data from the camera-side wireless module 111, to the camera-side wireless module 111.

In step S1112, the flash microcomputer 301 sets t3, received from the flash-side wireless module 308, as the period of waiting time, and upon the period of time t3 elapsing, the flash microcomputer 301 performs light emission based on information regarding the light emission preparations performed in step S106 shown in FIG. 3.

In step S1113, the camera microcomputer 101 performs exposure upon a period of time t0+α elapsing from step S1103. As a result, the camera 10 and flash 300 synchronize with each other.

Upon the shooting sequence being completed in this way, the camera microcomputer 101 and the flash microcomputer 301 return to the shooting standby state.

Next, with reference to FIG. 18, the following describes an operation sequence that is performed in a case where, after transmitting the time information t3 to the flash 300, the camera 10 has failed to receive a response packet from the flash 300.

FIG. 18 is a diagram illustrating an operation sequence of retry processing that is performed to re-transmit information at the time of flash synchronization shooting in a case where the camera 10 and the flash 300 perform one-to-one communication as shown in FIG. 1.

FIG. 18 illustrates an example in which retry processing is performed in a case where the camera-side wireless module 111 does not receive a response packet from the flash-side wireless module 308 after transmitting the time information t3 to the flash-side wireless module 308 in step S117 shown in FIG. 3.

Note that the configurations of the camera 10 and the flash 300 are the same as the configurations of those shown in FIGS. 2A and 2B according to the first embodiment. Also, the wireless communication scheme employed by the camera-side wireless module 111 and the flash-side wireless module 308, and operations that are performed until the second signal SW2 of the camera body 100 is turned ON are the same as those according to the first embodiment. Also, the camera 10 and the flash 300 perform communication at predetermined communication intervals α (step S1200). Also, processing steps (steps S1202 to S1206) that are performed in the camera body 100 from when the second signal SW2 is turned ON (step S1201) to when the remaining time t0 to exposure is determined and the time information t3 is transmitted are the same as those in the first embodiment.

In step S1205, upon the time to start wireless communication being reached, the camera-side wireless module 111 transmits the time information t3 to the flash-side wireless module 308. Here, it is assumed that the camera-side wireless module 111 has failed to receive a response packet from the flash-side wireless module 308 (step S1207) after transmitting t3 to the flash-side wireless module 308. If the camera-side wireless module 111 does not receive a response packet from the flash-side wireless module 308 within a predetermined period of time, the camera-side wireless module 111 determines that the reception of a response packet has failed, and outputs a failure notification to the camera microcomputer 101 in step S1208.

Processing performed in steps S1209 to S1213 is the same as that performed in steps S1107 to S1111 shown in FIG. 17.

In step S1214, after receiving the time information t3 in step S1212, the flash microcomputer 301 cancels t3 set in step S1206 as the period of waiting time, and sets t3 received in step S1212 as the period of waiting time again. Then, upon t3 elapsing, the flash microcomputer 301 emits light based on information regarding the light emission preparation operations performed in step S106 shown in FIG. 3.

In step S1215, the camera microcomputer 101 performs exposure upon a period of time t0+α elapsing from step S1203. As a result, the camera 10 and flash 300 synchronize with each other.

Upon the shooting sequence being completed in this way, the camera microcomputer 101 and the flash microcomputer 301 return to the shooting standby state.

Thus, if the camera-side wireless module 111 does not receive a response packet from the flash-side wireless module 308 in response to the light emission information that the camera-side wireless module 111 has transmitted to the flash-side wireless module 308, the camera-side wireless module 111 notifies the camera microcomputer 101 of the failure in receiving a response packet. Upon being notified by the camera-side wireless module 111 of the failure in receiving a response packet, the camera microcomputer 101 extends the remaining time t0 to exposure by the predetermined communication interval α, so that time information can be re-transmitted. To realize retry processing, a condition that the remaining time t0 to exposure is greater than twice the predetermined communication interval α (t0>2α) is provided. That is, the condition allows communication between the camera 10 and the flash 300 to be performed twice or more during the remaining time to exposure.

Also, there is the possibility of operability for the user being affected by retry processing if retry processing is repeated more than once, and therefore an upper limit is set for the number of times retry processing can be performed. It is assumed that, if the camera-side wireless module 111 does not receive a response packet through retry processing before the upper limit of the number of times is reached, the retry processing is stopped and the camera microcomputer 101 transitions to a shooting sequence.

In the present embodiment, a failure notification, which indicates that the camera-side wireless module 111 has failed to receive a response packet, triggers the camera microcomputer 101 to extend the remaining time t0 to exposure. However, the reception of a response packet may trigger the camera microcomputer 101. For example, after the remaining time t0 to exposure has been confirmed (steps S1103 and S1203), the camera microcomputer 101 enters a waiting state. The camera-side wireless module 111 sets t0 to light emission information that is to be transmitted to the flash-side wireless module 308, and after receiving a response packet corresponding to the light emission information, the camera-side wireless module 111 outputs a reception notification to the camera microcomputer 101. The camera microcomputer 101 performs exposure upon t0 elapsing after the camera microcomputer 101 receives the reception notification. As a result, the camera 10 and flash 300 synchronize with each other.

If the remaining time t0 to exposure is long enough and the flash 300 can emit light before when exposure is to be performed even if retry processing is performed more than once, it is unnecessary to extend the remaining time to exposure. Whether or not the camera 10 performs retry processing or extends the remaining time t0 to exposure may be decided based on conditions such as the shutter speed.

Twelfth Embodiment

The following describes a flash synchronization shooting system according to a twelfth embodiment.

FIG. 19 is a diagram illustrating an operation sequence of retry processing that is performed to re-transmit information at the time of flash synchronization shooting using the transmitter 400 attached to the camera body 100 and the flash 300 as shown in FIG. 7A.

FIG. 19 illustrates an example in which, when transmission and reception of time information t3 from the transmitter-side wireless module 402 to the flash-side wireless module 308 have failed in step S520 in FIG. 8B, retry processing is performed to extend the remaining time t0 to exposure and re-transmit the information.

Note that, in the twelfth embodiment, the configurations of the camera 10 and the flash 300, and the operations of the camera body 100 performed until the second signal SW2 is turned ON are the same as those in the first embodiment.

The twelfth embodiment is different from the eleventh embodiment in that the camera 10 and the flash 300 perform wireless communication via the transmitter 400, and the transmitter-side wireless module 402 is used instead of the camera-side wireless module 111. Communication that uses the transmitter 400 is performed to transmit light emission information in steps S1304 and S1305 and a failure notification in step S1307 and S1308 in FIG. 19. Processing performed in these steps is added to FIG. 17 according to the eleventh embodiment. The twelfth embodiment is otherwise the same as the eleventh embodiment.

As described above, even in a case where the transmitter-side wireless module 402, which is an external apparatus, is used instead of the camera-side wireless module 111, it is possible to perform retry processing and establish synchronization between exposure performed by the camera 10 and light emission performed by the flash 300.

In the twelfth embodiment, retry processing may be performed in a case where the camera 10 fails to receive a response packet from the flash 300 after transmitting time information t3 to the flash 300, as in FIG. 18 according to the eleventh embodiment.

Thirteenth Embodiment

The following describes a flash synchronization shooting system according to a thirteenth embodiment.

Figure 20A:
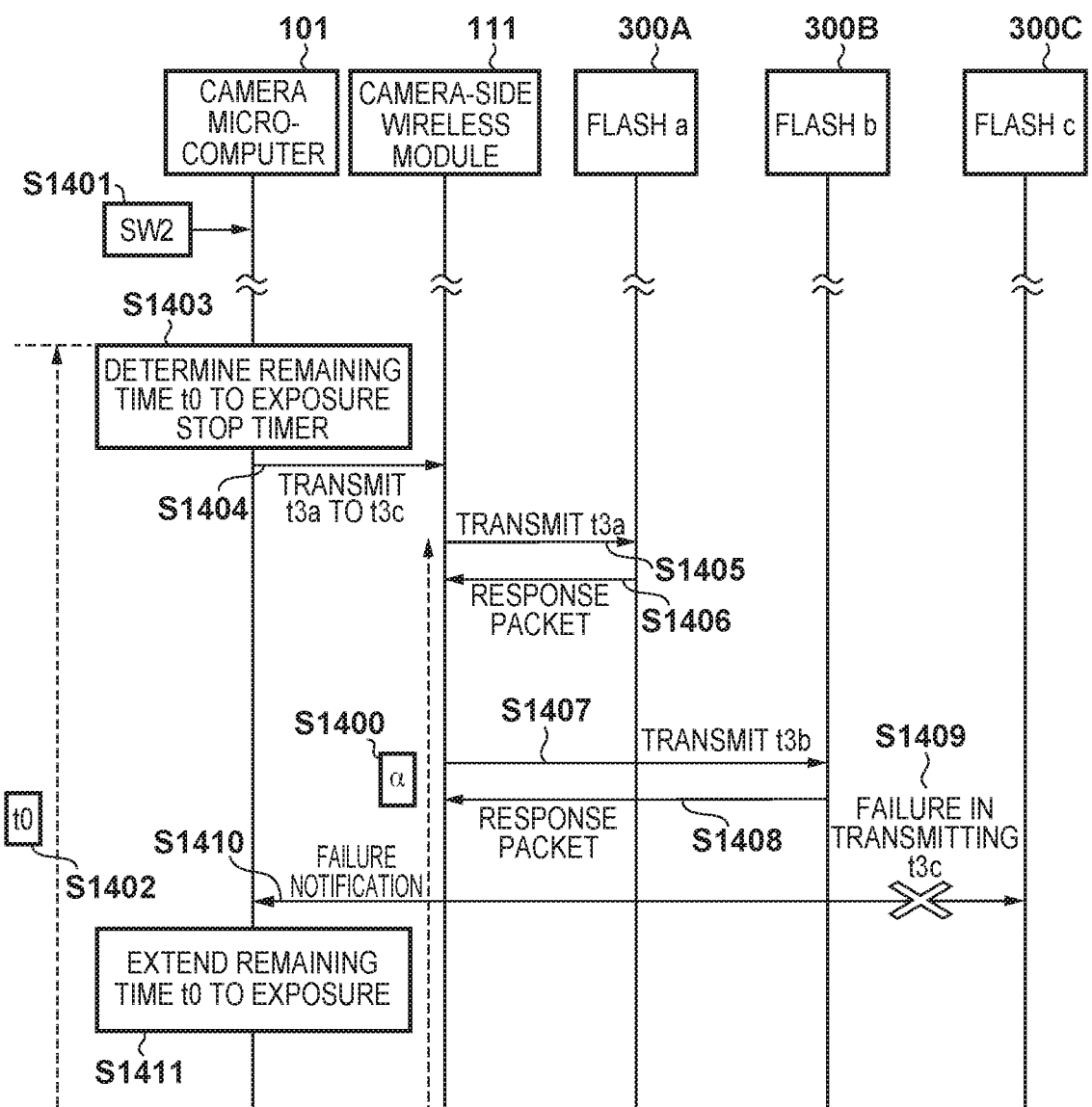
FIGS. 20A and 20B are sequence diagrams illustrating operations performed during flash synchronization shooting according to a thirteenth embodiment.
Figure 20B:
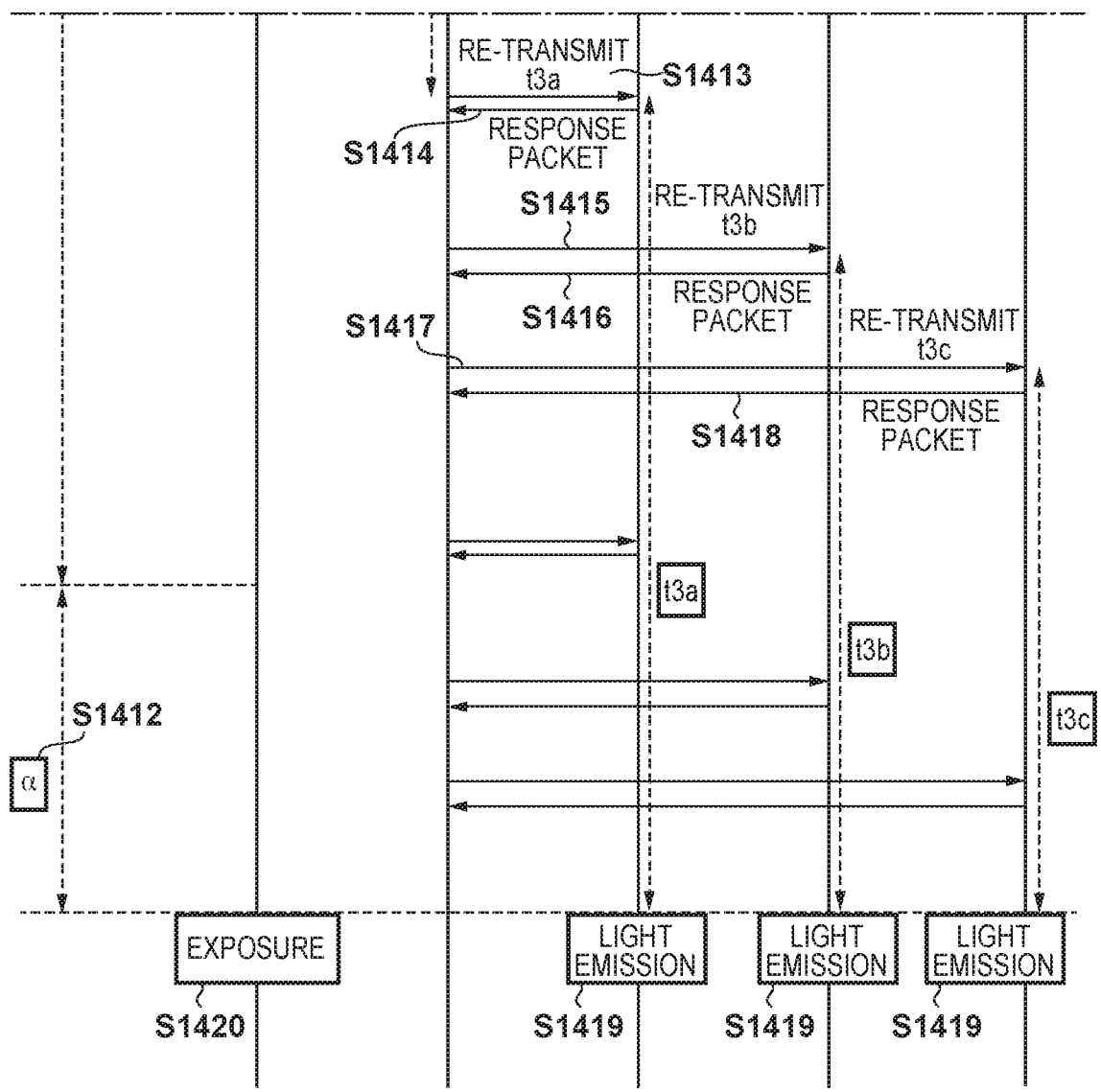

FIGS. 20A and 20B are diagrams illustrating an operation sequence of retry processing that is performed to re-transmit information at the time of flash synchronization shooting in a case where the camera 10 and the flashes 300A to 300C perform one-to-many communication as shown in FIG. 9.

FIGS. 20A and 20B illustrate an example in which, when transmission of time information t3c from the camera-side wireless module 111 to the flash-side wireless module 308 of the flash 300C has failed in step S630 in FIG. 10B, retry processing is performed to extend the remaining time t0 to exposure and re-transmit the information.

Note that, in the present embodiment, as in the above-described embodiments, the camera 10 and each of the flashes 300A to 300C perform wireless communication at predetermined intervals (intervals α) (step S1400). Also, after transmitting the pieces of time information t3a to t3c to the flash-side wireless modules 308 of the flashes 300A to 300C, the camera-side wireless module 111 notifies the camera microcomputer 101 of the points in time at which the camera-side wireless module 111 received response packets from the flashes 300A to 300C. Similarly, the flash-side wireless modules 308 of the flashes 300A to 300C notify the flash microcomputers 301 of the points in time at which the flash-side wireless modules 308 received the pieces of time information t3a to t3c from the camera 10.

Note that the configurations of the camera 10 and each of the flashes 300A to 300C are the same as the configurations of those shown in FIGS. 2A and 2B according to the first embodiment. Also, the wireless communication scheme employed by the camera-side wireless module 111 and the flash-side wireless modules 308, and operations that are performed by the camera body 100 until the second signal SW2 is turned ON are the same as those according to the first embodiment. Also, the camera 10 and the flashes 300A to 300C perform communication at predetermined communication intervals α (step S1400). Also, processing steps (steps S1402 to S1408) that are performed from when the second signal SW2 of the camera body 100 is turned ON (step S1401) to when the remaining time t0 to exposure is determined and the time information t3 is transmitted are the same as those in the sixth embodiment.

Although three flashes are used in the present embodiment, the number of flashes may be two or four or more.

In steps S1405, S1407, and S1409, upon the time to perform wireless communication being reached, the camera-side wireless module 111 transmits the pieces of time information t3a to t3c to the flash-side wireless modules 308 of the flashes 300A to 300C. Here, it is assumed that the camera-side wireless module 111 has failed to receive a response packet from the flash-side wireless module 308 of the flash 300C (step S1409). If the camera-side wireless module 111 does not receive a response packet from the flash-side wireless module 308 of the flash 300C within a predetermined period of time, the camera-side wireless module 111 determines that the reception of a response packet has failed, and outputs a failure notification to the camera microcomputer 101 in step S1410.

In step S11411, upon receiving the failure notification, the camera microcomputer 101 performs processing to extend the remaining time t0 to exposure, to extend the remaining time t0 to exposure to t0+α as shown in step S1412, in order to perform retry processing.

In steps S1413, S1415, and S1417, upon the time to perform the subsequent wireless communication being reached, the camera-side wireless module 111 re-transmits the pieces of time information t3a to t3c to the flash-side wireless modules 308 of the flashes 300A to 300C. The flash-side wireless modules 308 of the flashes 300A to 300C output the pieces of time information t3a to t3c received from the camera-side wireless module 111, to the flash microcomputers 301 of the flashes 300A to 300C as pieces of light emission information.

In steps S1414 and S1416, the flash-side wireless modules 308 of the flashes 300A and 300B transmit response packets indicating that the flash-side wireless modules 308 have received non-null data from the camera-side wireless module 111, to the camera-side wireless module 111.

In step S1419, the flash microcomputers 301 of the flashes 300A and 300B cancel t3a and t3b received in steps S1415 and S1417 and set as the periods of waiting time in steps S1406 and S1408. The flash microcomputers 301 also set the pieces of time information t3a and t3b received in steps S1413 and S1415 again, as the periods of waiting time. The flash microcomputer 301 of the flash 300C did not receive time information t3c in step S1409, and t3c has not been set as the period of waiting time. Therefore, the time information t3c received in step S1417 is newly set as the period of waiting time. Then, upon the periods t3a to t3c elapsing, the flash microcomputers 301 respectively emit light based on information regarding the light emission preparation operations performed in steps S604, S606, and S608 shown in FIG. 10A.

In step S1420, the camera microcomputer 101 performs exposure upon a period of time t0+α elapsing from step S1403. As a result, the camera 10 and flashes 300A to 300C synchronize with each other.

Upon the shooting sequence being completed in this way, the camera microcomputer 101 and the flash microcomputers 301 of the flashes 300A to 300C return to the shooting standby state.

Thus, if the camera-side wireless module 111 does not receive a response packet from at least one flash in response to the pieces of light emission information that the camera-side wireless module 111 has transmitted to the flashes 300A to 300C, the camera-side wireless module 111 notifies the camera microcomputer 101 of the failure in receiving a response packet. Upon being notified by the camera-side wireless module 111 of the failure in receiving a response packet, the camera microcomputer 101 extends the remaining time t0 to exposure by the predetermined communication interval α, so that time information can be re-transmitted.

Note that descriptions of a condition for allowing retry processing to be performed, the upper limit of the number of times retry processing can be performed, and a condition for extending the remaining time to exposure (i.e. descriptions of the fact that reception of a response packet may be a trigger, and a case in which the remaining time to exposure is long enough) are omitted because they are the same as in the eleventh embodiment.

In the thirteenth embodiment, retry processing may be performed in a case where the camera 10 fails to receive a response packet from the flashes 300A to 300C after transmitting the pieces of time information t3a to t3c to the flashes 300A to 300C, as in FIG. 18 according to the eleventh embodiment.

Also, the flashes 300A to 300C according to the thirteenth embodiment may perform communication with the camera 10 via the transmitter 400 as in the tenth and twelfth embodiment.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-206331, filed Oct. 25, 2017 which is hereby incorporated by reference herein in its entirety.

What is claimed is:

1. An image capturing apparatus that controls a light emitting apparatus, comprising:
a wireless communication unit configured to perform communication with the light emitting apparatus at predetermined intervals;
a deciding unit configured to, upon receiving an instruction to cause the light emitting apparatus to emit light to perform shooting, decide information regarding a period of time remaining before the light emitting apparatus emits light, based on the remaining time to exposure and a period of time from when the remaining time starts decreasing, to when the wireless communication unit performs a first wireless communication thereafter; and
a control unit configured to perform control so that the information regarding the period of time decided by the deciding unit is transmitted to the light emitting apparatus through the first wireless communication with the light emitting apparatus,
wherein, in a case where transmission and reception of the information regarding the period of time between the image capturing apparatus and the light emitting apparatus fail, the control unit performs control so that the information regarding the period of time is re-transmitted.

2. The apparatus according to claim 1, wherein
in a case where the wireless communication unit does not receive a response from the light emitting apparatus after transmitting the information regarding the period of time, the control unit determines that transmission and reception of the information regarding the period of time have failed.

3. The apparatus according to claim 1, wherein
in a case where transmission and reception of the information regarding the period of time fail, the wireless communication unit notifies the control unit of the failure.

4. The apparatus according to claim 3, wherein
in a case where the control unit is notified by the wireless communication unit of the failure, the control unit extends the remaining time to exposure by adding the predetermined interval to the remaining time to exposure, and the information regarding the period of time is re-transmitted.

5. The apparatus according to claim 4, wherein
in a case where re-transmission can be performed within the remaining time to exposure, the information regarding the period of time is re-transmitted without the control unit extending the remaining time to exposure.

6. The apparatus according to claim 1, wherein
the remaining time to exposure is longer than twice the predetermined interval.

7. The apparatus according to claim 1, wherein
the number of times the re-transmission can be performed has an upper limit, and
in a case where the information regarding the period of time cannot be transmitted or received through the re-transmission before the upper limit is reached, the control unit performs control to stop the re-transmission and make a transition to a shooting operation.

8. The apparatus according to claim 1, wherein
the light emitting apparatus is provided in a plurality, and the wireless communication unit is capable of communicating with the plurality of light emitting apparatuses, and
the control unit performs control so that the information regarding the period of time is transmitted to the plurality of light emitting apparatuses, and in a case where transmission and reception of the information regarding the period of time fails for at least one of the plurality of light emitting apparatuses, the control unit performs control so that the information regarding the period of time is re-transmitted to all of the light emitting apparatuses.

9. The apparatus according to claim 1, wherein
the wireless communication unit is attachable to the image capturing apparatus.

10. A light emitting apparatus that is controlled by an image capturing apparatus, comprising:
a wireless communication unit configured to perform communication with the image capturing apparatus at predetermined intervals; and
a deciding unit configured to, after receiving light emission information that is used to perform light emission preparations from the image capturing apparatus, receive time information regarding a period of time from when remaining time before the image capturing apparatus performs exposure starts decreasing, to when the wireless communication unit performs a first wireless communication thereafter, and obtain a period of waiting time remaining before the light emitting apparatus emits light, based on the information regarding the period of time,
wherein, in a case where the deciding unit receives new time information after receiving the time information from the image capturing apparatus, the deciding unit cancels the period of waiting time decided based on the previously received time information, and decides a period of waiting time based on the newly received time information.

11. The apparatus according to claim 10, wherein
in a case where the time information is received from the image capturing apparatus, the wireless communication unit transmits a response to the image capturing apparatus.

12. The apparatus according to claim 10, wherein
the light emitting apparatus is provided in plurality and each of the light emitting apparatuses is capable of communicating with the image capturing apparatus, and
each of the light emitting apparatuses obtains the period of waiting time based on the time information received from the image capturing apparatus.

13. A method for controlling an image capturing apparatus that includes a wireless communication unit configured to communicate with a light emitting apparatus at predetermined intervals, and controls the light emitting apparatus via wireless communication, the method comprising:
upon receiving an instruction to cause the light emitting apparatus to emit light to perform shooting, deciding time information regarding a period of time remaining before the light emitting apparatus emits light, based on the remaining time to exposure and a period of time from when the remaining time starts decreasing to when the image capturing apparatus performs the first wireless communication thereafter; and
controlling such that the time information regarding the decided period of time is transmitted to the light emitting apparatus through the first wireless communication with the light emitting apparatus,
wherein, in the controlling, in a case where transmission and reception of the time information between the image capturing apparatus and the light emitting apparatus fail, the control unit performs control so that the time information is re-transmitted.

14. A method for controlling a light emitting apparatus that includes a wireless communication unit configured to communicate with an image capturing apparatus at predetermined intervals, and is controlled by the image capturing apparatus via wireless communication, the method comprising:
after receiving light emission information that is used to perform light emission preparations from the image capturing apparatus, receiving time information regarding a period of time from when remaining time before the image capturing apparatus performs exposure starts decreasing, to when the first wireless communication thereafter is to be performed, and obtaining a period of waiting time remaining before the light emitting apparatus emits light, based on the information regarding the period of time,
wherein, in the obtaining, in a case where new time information is received after the time information has been received from the image capturing apparatus, the period of waiting time decided based on the previously received time information is cancelled, and a period of waiting time is decided based on the newly received time information.

15. A non-transitory computer-readable storage medium storing a program for causing a computer to execute a method for controlling an image capturing apparatus that includes a wireless communication unit configured to communicate with a light emitting apparatus at predetermined intervals, and controls the light emitting apparatus via wireless communication, the method comprising:
upon receiving an instruction to cause the light emitting apparatus to emit light to perform shooting, deciding time information regarding a period of time remaining before the light emitting apparatus emits light, based on the remaining time to exposure and a period of time from when the remaining time starts decreasing to when the image capturing apparatus performs the first wireless communication thereafter; and
controlling such that the time information regarding the decided period of time is transmitted to the light emitting apparatus through the first wireless communication with the light emitting apparatus, wherein, in the controlling, in a case where transmission and reception of the time information between the image capturing apparatus and the light emitting apparatus fail, the control unit performs control so that the time information is re-transmitted.

16. A non-transitory computer-readable storage medium storing a program for causing a computer to execute a method for controlling a light emitting apparatus that includes a wireless communication unit configured to communicate with an image capturing apparatus at predetermined intervals, and is controlled by the image capturing apparatus via wireless communication, the method comprising:

after receiving light emission information that is used to perform light emission preparations from the image capturing apparatus, receiving time information regarding a period of time from when remaining time before the image capturing apparatus performs exposure starts decreasing, to when the first wireless communication thereafter is to be performed, and obtaining a period of waiting time remaining before the light emitting apparatus emits light, based on the information regarding the period of time, wherein, in the obtaining, in a case where new time information is received after the time information has been received from the image capturing apparatus, the period of waiting time decided based on the previously received time information is cancelled, and a period of waiting time is decided based on the newly received time information.

* * * * *